(12) United States Patent  
Kelly et al.

(10) Patent No.: US 9,493,160 B2
(45) Date of Patent: Nov. 15, 2016

(54) VEHICLE SPEED CONTROL SYSTEM

(71) Applicant: Jaguar Land Rover Limited, Whitley Coventry Warwickshire (GB)

(72) Inventors: James Kelly, Solihull (GB); Andrew Fairgrieve, Rugby (GB); Daniel Woolliscroft, Birmingham (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/421,924

(22) PCT Filed: Aug. 16, 2013

(86) PCT No.: PCT/EP2013/067200
§ 371 (c)(1),
(2) Date: Feb. 16, 2015

(87) PCT Pub. No.: WO2014/027111
PCT Pub. Date: Feb. 20, 2014

(65) Prior Publication Data
US 2015/0203117 A1    Jul. 23, 2015

(30) Foreign Application Priority Data
Aug. 16, 2012  (GB) .................................. 1214651.0

(51) Int. Cl.
*B60T 8/175*   (2006.01)
*B60W 30/14*   (2006.01)
(Continued)

(52) U.S. Cl.
CPC ............ *B60W 30/143* (2013.01); *B60K 28/16* (2013.01); *B60K 31/02* (2013.01); *B60K 31/04* (2013.01);
(Continued)

(58) Field of Classification Search
CPC ..................... B60T 8/175; B60K 31/04; B60K 31/02; B60W 30/14; B60W 30/18
(Continued)

(56) References Cited

U.S. PATENT DOCUMENTS 7,349,776 B2    3/2008  Spillane et al.
8,195,371 B2    6/2012  Yasui et al.
(Continued)

FOREIGN PATENT DOCUMENTS

DE      102005023701 A1    12/2006
EP          1355209 A1    10/2003
(Continued)

OTHER PUBLICATIONS

Search Report corresponding to application No. GB1214651.0, dated Apr. 25, 2013, 2 pages.
(Continued)

*Primary Examiner* — Tao Q Nguyen
(74) *Attorney, Agent, or Firm* — Reising Ethington P.C.

(57) ABSTRACT

A vehicle speed control system for a vehicle having a plurality of wheels, the vehicle speed control system comprising one or more electronic control units configured to carry out a method that includes applying torque to at least one of the plurality of wheels, detecting a slip event between any one or more of the wheels and the ground over which the vehicle is travelling when the vehicle is in motion and providing a slip detection output signal in the event thereof. The method carried out by the one or more electronic control units further includes receiving a user input of a target speed at which the vehicle is intended to travel and maintaining the vehicle at the target speed independently of the slip detection output signal by adjusting the amount of torque applied to the at least one of the plurality of wheels.

20 Claims, 17 Drawing Sheets

(51) Int. Cl.
   *B60K 28/16* (2006.01)
   *B60K 31/02* (2006.01)
   *B60K 31/04* (2006.01)
   *F16H 61/02* (2006.01)
   *B60W 30/18* (2012.01)
   *B60W 40/06* (2012.01)
   *F16H 59/66* (2006.01)

(52) U.S. Cl.
   CPC ......... *B60T 8/175* (2013.01); *B60W 30/18172* (2013.01); *B60W 40/06* (2013.01); *F16H 61/0213* (2013.01); *B60T 2201/04* (2013.01); *B60T 2210/14* (2013.01); *B60T 2210/16* (2013.01); *B60T 2220/04* (2013.01); *B60T 2260/06* (2013.01); *B60W 2520/10* (2013.01); *B60W 2520/26* (2013.01); *B60W 2550/141* (2013.01); *B60W 2720/10* (2013.01); *B60W 2720/28* (2013.01); *B60W 2720/30* (2013.01); *B60Y 2200/20* (2013.01); *F16H 59/66* (2013.01); *F16H 2061/0234* (2013.01)

(58) Field of Classification Search
   USPC ................ 701/93, 71, 74, 79, 82, 89, 69, 91
   See application file for complete search history.

(56) References Cited

U.S. PATENT DOCUMENTS

| | | | |
|---|---|---|---|
| 2003/0045990 A1 | 3/2003 | Adachi | |
| 2006/0173602 A1* | 8/2006 | Graf | B60K 6/26 701/54 |
| 2007/0067087 A1* | 3/2007 | Ohshima | B60K 31/047 701/93 |
| 2009/0024263 A1* | 1/2009 | Simon, Jr. | B60K 6/485 701/22 |
| 2009/0037069 A1 | 2/2009 | Inoue et al. | |
| 2009/0255746 A1 | 10/2009 | Boesch | |
| 2012/0150376 A1* | 6/2012 | Ash | B60L 7/26 701/22 |
| 2015/0175009 A1 | 6/2015 | Beever et al. | |

FOREIGN PATENT DOCUMENTS

| | | |
|---|---|---|
| EP | 2082936 A2 | 7/2009 |
| GB | 2276683 A | 10/1994 |
| GB | 2357159 A | 12/1999 |
| GB | 2403027 A | 12/2004 |
| GB | 2454337 A | 5/2009 |
| GB | 2494413 A | 9/2011 |
| JP | H10507145 A | 7/1998 |
| JP | 2001047888 A | 2/2001 |
| JP | 2003063272 A | 3/2003 |
| JP | 2005022522 A | 1/2005 |
| JP | 2007326427 A | 12/2007 |
| WO | WO9611826 A1 | 4/1996 |
| WO | 2012088537 A1 | 6/2012 |
| WO | 2013186208 A2 | 12/2013 |

OTHER PUBLICATIONS

Combined Search and Examination Report corresponding to application No. GB1314727.7, dated Feb. 28, 2014, 7 pages.
International Search Report for application No. PCT/EP2013/067200, dated Nov. 25, 2013, 3 pages.
UK Combined Search and Examination Report for corresponding application No. 1214651.0, dated Dec. 5, 2012, 7 pages.
Written Opinion for application No. PCT/EP2013/067200, dated Nov. 25, 2013, 5 pages.
Japanese Notice of Reasons for Rejection, in Japanese with English summary, corresponding to JP application No. 2015-527003, dated Mar. 15, 2016, 7 pages.
Japanese Office Action in Japanese with English summary for JP application No. 2015-527003, dated Aug. 23, 2016, 7 pages.

* cited by examiner

VEHICLE SPEED CONTROL SYSTEM

FIELD OF THE INVENTION

The invention relates to a system for controlling the speed of a vehicle. In particular, but not exclusively, the invention relates to a system for controlling the speed of a land-based vehicle which is capable of driving in a variety of different and extreme terrains and conditions.

BACKGROUND TO THE INVENTION

In known vehicle speed control systems, typically referred to as cruise control systems, the vehicle speed is maintained once set by the user without further intervention by the user so as to improve the driving experience for the user.

The user selects a speed at which the vehicle is to be maintained, and the vehicle is maintained at that speed for as long as the user does not apply a brake or, in some systems, the clutch. The cruise control system takes its speed signal from the driveshaft or wheel speed sensors. When the brake or the clutch is depressed, the cruise control system is disabled so that the user can change the vehicle speed without resistance from the system. If the user depresses the accelerator pedal the vehicle speed will increase, but once the user removes his foot from the accelerator pedal the vehicle reverts to the pre-set cruise speed.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly.

Such systems are usually operable only above a certain speed, typically around 15 mph., and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

It is also known to provide a control system for a motor vehicle for controlling one or more vehicle subsystems. U.S. Pat. No. 7,349,776, the content of which is hereby incorporated by reference, discloses a vehicle control system comprising a plurality of subsystem controllers including an engine management system, a transmission controller, a steering controller, a brakes controller and a suspension controller. The subsystem controllers are each operable in a plurality of subsystem function modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR)® System or controller.

SUMMARY

Embodiments of the invention may be understood with reference to the appended claims.

Aspects of the present invention provide a system, a vehicle and a method.

It is with a view to addressing the aforementioned limitations of existing systems that the present invention provides, in an aspect of the invention for which protection is sought there is provided, a vehicle speed control system for a vehicle having a plurality of wheels, the vehicle speed control system configured to automatically control the speed of the vehicle to a target set-speed and comprising means for applying a torque to at least one of the plurality of wheels; means for detecting a slip event between any one or more of the wheels and the ground over which the vehicle is travelling when the vehicle is in motion and for providing a slip detection output signal in the event thereof; and means for receiving a user input of a target speed at which the vehicle is intended to travel. The system further comprises means for maintaining the vehicle at the target speed independently of the slip detection output signal. The user input of target speed will be understood to be a target set-speed of the automatic speed control system.

In another aspect of the invention for which protection is sought there is provided, a vehicle speed control system for a vehicle having a plurality of wheels and a powertrain for providing a torque thereto, the vehicle speed control system comprising: means for receiving an input signal indicative of a slip event between any one or more of the wheels and the ground over which the vehicle is travelling when the vehicle is in motion; means for receiving a user input of a target speed at which the vehicle is intended to travel; and means for outputting a torque request signal to control the vehicle powertrain, wherein the system is operable to maintain the vehicle at the target speed independently of the slip detection output signal.

A problem with existing vehicle speed control systems, such as cruise control systems, is that the system is cancelled when the vehicle detects a wheel slip event at one or more wheel. The system will also cancel upon activation of the anti-lock braking system (ABS), the traction control system or stability control systems or the like. Whilst the approach taken by known cruise control systems may be entirely appropriate for driving on the highway, it makes these 'on-highway' cruise control systems unreliable and entirely inappropriate for use in most off-road driving applications, where the driving speed is typically much lower and the varied nature of the terrain tends to give rise to frequent slip events.

In other words, driving in adverse and slippery conditions off-road, where wheel slip is not uncommon, on-highway cruise control systems are ineffective.

It is one benefit of at least some embodiments of the invention that it provides a speed-based control which enables the user to select a very low target speed at which the vehicle progresses without any pedal inputs being required by the user once the vehicle is moving and, moreover, which is not disabled upon activation of any of the vehicle slip control mechanisms. In particular, this enables the speed of the vehicle to be controlled in driving conditions where wheel slip may occur relatively frequently, such as on slippery or icy terrain, but where low speed progress of the vehicle is still desirable.

It is a further benefit of at least some embodiments of the invention that as the user does not have to concentrate on regulating the speed of the vehicle, it is easier to focus on navigational aspects such as route planning and obstacle avoidance. This is particularly advantageous when the terrain over which the vehicle is travelling is challenging to navigate, such as, for example, for off-road terrains (such as sand, rock, gravel) or in conditions such as ice or snow or where the vehicle is being driven through deep water, where the demands on user concentration are greater.

According to a further aspect of the invention for which protection is sought there is provided a memory device which comprises a carrier medium carrying a computer-readable code for controlling the vehicle to carry out the method described above.

It will be appreciated that preferred and/or optional features of any one aspect of the invention may be incorporated alone or in appropriate combination within the any other aspect of the invention also.

BRIEF DESCRIPTION OF THE DRAWINGS

The invention will now be described by way of example only with reference to the following figures in which.

DETAILED DESCRIPTION

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function block is made for ease of explanation of the manner of operation of the controller.

Figure 1:
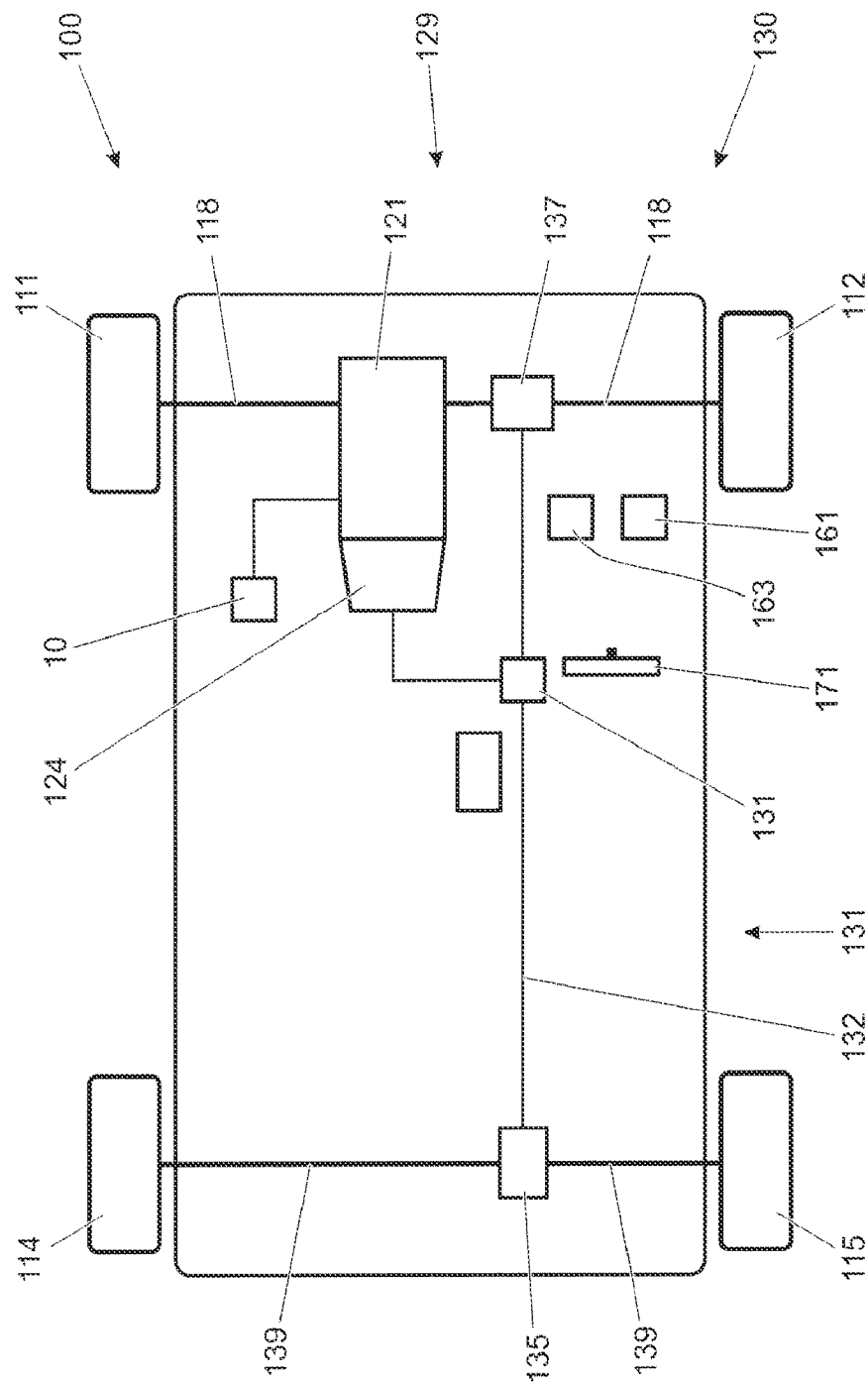
FIG. 1 is a schematic illustration of a vehicle according to an embodiment of the invention in plan view.
Figure 2:
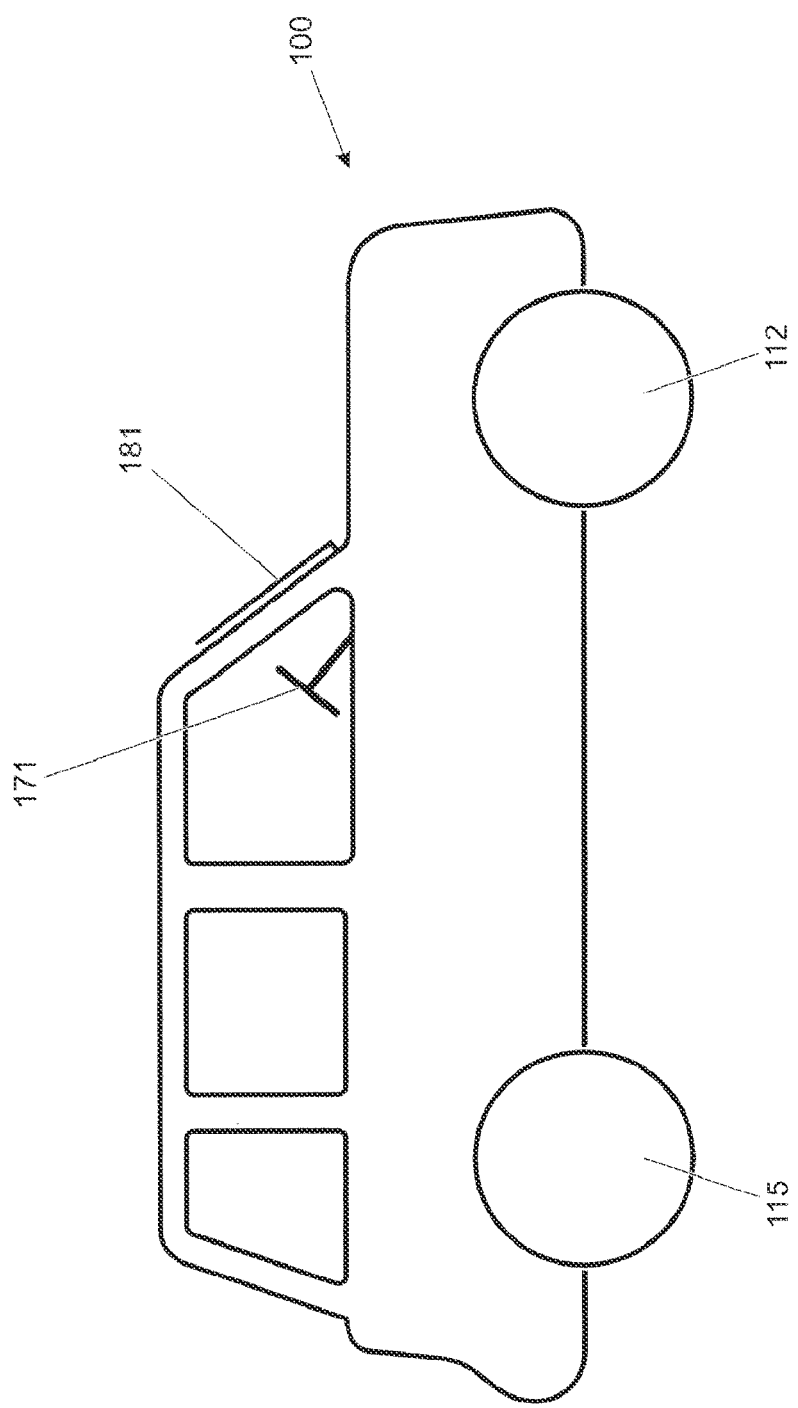
FIG. 2 shows the vehicle of FIG. 1 in side view.

Embodiments of the invention are suitable for use in vehicles with automatic or continuously variable transmissions. FIG. 1 shows a vehicle 100 according to an embodiment of the invention having a powertrain 129. The powertrain 129 includes an engine 121 that is connected to a driveline 130 having a transmission 124. The driveline 130 is arranged to drive a pair of front vehicle wheels 111, 112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131, allowing selectable two wheel drive or four wheel drive operation. It is to be understood that embodiments of the invention may be suitable for vehicles having more than four wheels or where only two wheels are driven, for example two wheels of a three wheeled vehicle or four wheeled vehicle or a vehicle with more than four wheels.

The control system for the vehicle engine 121 includes a central controller, referred to as the vehicle control unit (VCU) 10. The VCU 10 receives and outputs a plurality of signals to and from various sensors and subsystems (not shown) provided on the vehicle. The VCU 10 includes a low-speed progress (LSP) control system 12 and a stability control system (SCS) 14, the latter being a known component of existing vehicle control systems. The SCS 14 improves the safety of the vehicle by detecting and reducing loss of traction. When a loss of steering control is detected, the SCS 14 automatically applies the brakes to help to steer the vehicle in the direction the user wants to go.

Figure 3:
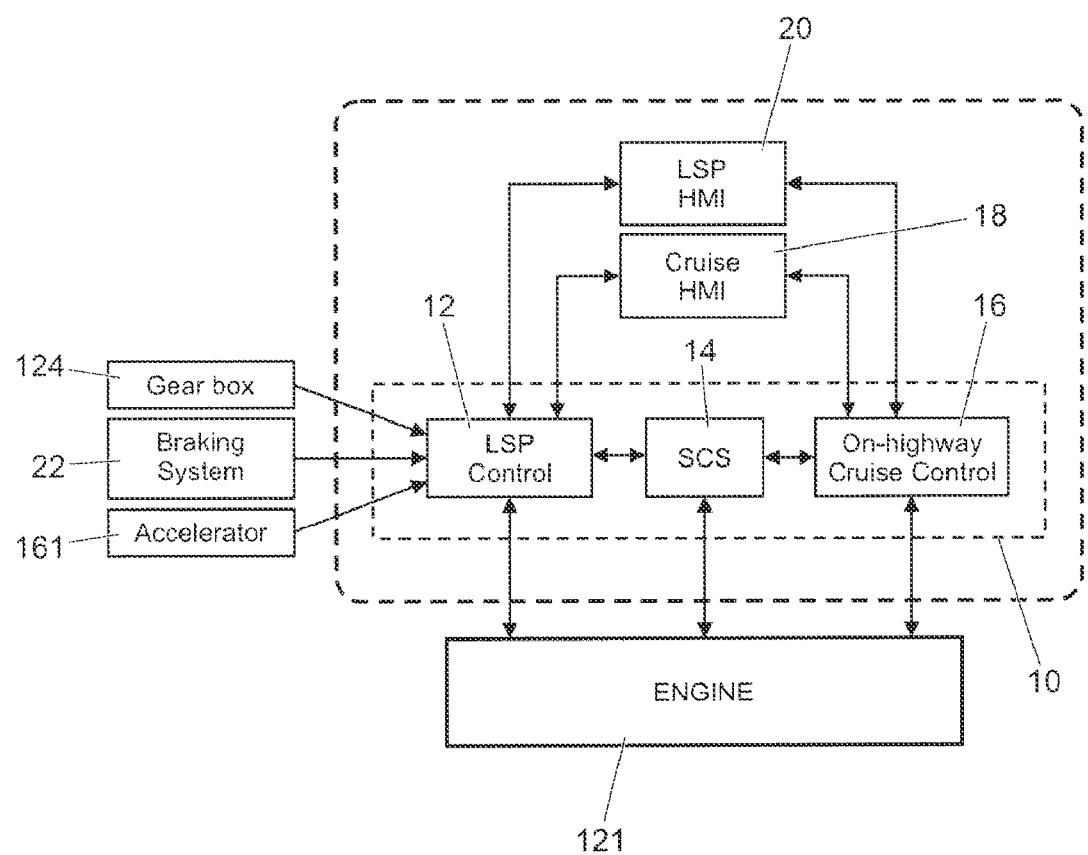
FIG. 3 is a high level schematic diagram of an embodiment of the vehicle speed control system of the present invention, including a cruise control system and a low-speed progress control system.

Although not shown in detail in FIG. 3, the VCU 10 further includes a Dynamic Stability Control (DSC) function block, a Traction Control (TC) function block, an Anti-Lock Braking System (ABS) function block and a Hill Descent Control (HDC) function block. These function blocks provide outputs indicative of, for example, DSC activity, TC activity, ABS activity, brake interventions on individual wheels and engine torque reduction requests from the VCU 10 to the engine 121. All of the aforementioned events indicate that a wheel slip event has occurred. Other vehicle sub-systems such as a roll stability control system or the like may also be useful.

The vehicle also includes a cruise control system 16 which is operable to automatically maintain vehicle speed at a selected speed when the vehicle is travelling at speeds in excess of 30 mph. The cruise control system 16 is provided with a cruise control HMI 18 by which means the user can input a target vehicle speed to the cruise control system 16 in a known manner. In one embodiment of the invention, cruise control system input controls are mounted to a steering wheel 171. Depression of a 'set-speed' control 173 sets the set-speed to the current vehicle speed. Depression of a '+' button 174 allows the set speed to be increased whilst depression of a '−' button allows the set speed to be decreased.

The cruise control system 16 monitors vehicle speed and any deviation from the target vehicle speed is adjusted automatically so that the vehicle speed is maintained at a substantially constant value, typically in excess of 30 mph. In other words, the cruise control system is ineffective at speeds lower than 30 mph. The cruise HMI 18 may also be configured to provide an alert to the user about the status of the cruise control system via a visual display of the HMI 18.

The LSP control system 12 provides a speed-based control system for the user which enables the user to select a very low target speed at which the vehicle can progress without any pedal inputs being required by the user. This low-speed progress control function is not provided by the on-highway cruise control system 16 which operates only at speeds above 30 mph. Furthermore, known on-highway cruise control systems including the present system 16 are configured so that, in the event that the user depresses the brake or the clutch, the cruise control function is over-ridden and the vehicle reverts to a manual mode of operation which requires user pedal input to maintain vehicle speed. In addition, detection of a wheel slip event, as may be initiated by a loss of traction, has the effect of suspending the cruise control function.

The LSP control is implemented by applying selective powertrain, traction control and braking actions to the wheels of the vehicle, collectively or individually, to maintain the vehicle at the desired speed. The user inputs the desired target speed to the LSP control system 12 via a low-speed progress HMI (LSP HMI) 20. The LSP control system 12 operates at vehicle speeds typically below about 50 mph but does not activate until vehicle speed drops to below 30 mph when the cruise control system of the vehicle becomes ineffective. The LSP control system 12 is configured to operate independently of traction events, such as wheel slip, and in this way, at least, differs from the functionality of the cruise control system 16, as will be described in further detail below.

The LSP HMI 20 is provided in the vehicle cabin. The user of the vehicle is able to input to the LSP control system 12, via the LSP HMI 20 and a signal line 21, the speed at which it is desired for the vehicle to travel (referred to as "the target speed"). The LSP HMI 20 also includes a visual display (not shown) upon which an alert can be provided to the user about the status of the LSP control system 12.

The LSP control system 12 receives an input from a braking system 22 of the vehicle, which is an input indicative of the extent to which the user has applied braking by means of a brake pedal 163. The LSP control system 12 also receives an input from an accelerator pedal 161, which is an input indicative of the extent to which the user has depressed the accelerator pedal 161. An input is also provided to the LSP control system 12 from the transmission or gearbox 124 and any associated control means not shown. This input may include signals representative of, for example, the speed of the output shaft from the gearbox 124, torque converter slip and a gear ratio request. Other inputs to the LSP control system 12 include an input from the cruise HMI 18 which is representative of the status (ON/OFF) of the cruise control system 16, and an input from the LSP HMI 20 which is representative of the status of the LSP control function. The cruise HMI 18 and the LSP HMI 20 are typically mounted on or adjacent to the steering wheel of the vehicle for convenience of operation by the user.

Figure 4:
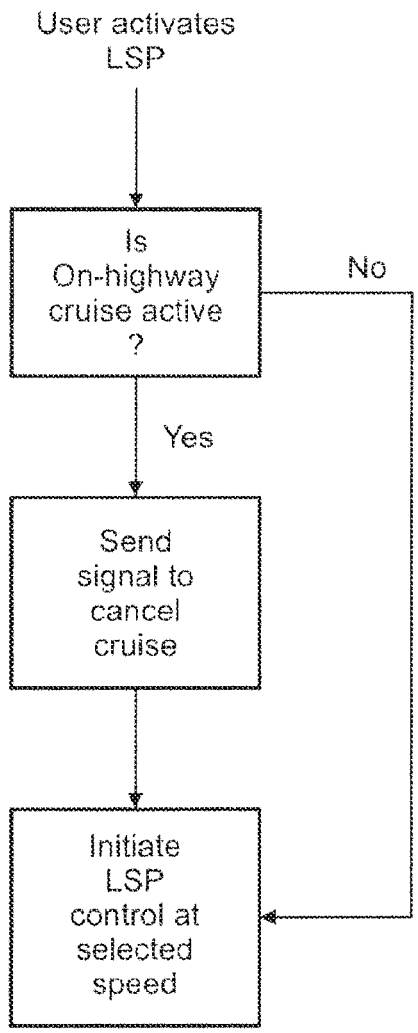
FIG. 4 is a flow diagram to illustrate the interaction between the cruise control system and the low-speed progress control system in FIG. 3.

The cruise control HMI and the LSP HMI are arranged adjacent to one another in the vehicle cabin, and preferably on the steering wheel of the vehicle for convenience of operation by the user. FIG. 4 shows a flow process to illustrate the interaction between the cruise control system 18 and the LSP control system 12. If cruise control is active when the user tries to activate the LSP control system 12 via the LSP HMI 20, a signal is sent to the cruise control system 16 to cancel the speed control routine. The LSP control system 12 is then initiated and the vehicle speed is maintained at the low target speed selected by the user via the LSP HMI 20. It is also the case that if the LSP control system 12 is active, operation of the cruise control system 16 is inhibited. The two systems 12, 16 therefore operate independently of one another, so that only one can be operable at any one time, depending on the speed at which the vehicle is travelling.

In another embodiment, the cruise HMI 18 and the LSP HMI 20 may be configured within the same hardware so that, for example, the speed selection is input via the same hardware, with a separate switch being provided to switch between the LSP input and the cruise control input.

Figure 5:
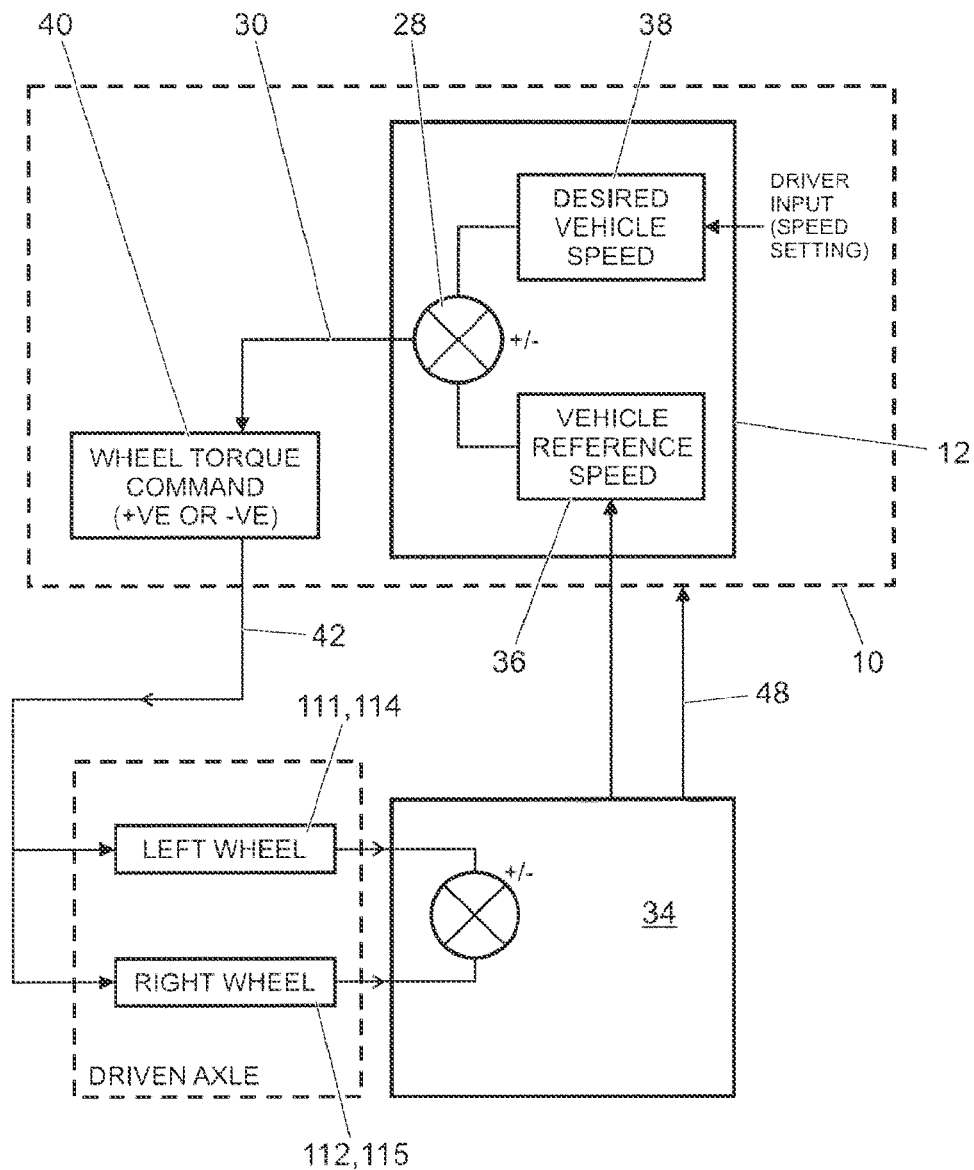
FIG. 5 is a schematic diagram of further features of the vehicle speed control system in FIG. 3.

FIG. 5 illustrates the means by which vehicle speed is controlled in the LSP control system 12. The speed selected to the user is input to the LSP control system 12 via the LSP HMI 20. A vehicle speed sensor 34 associated with the engine provides a signal 36 indicative of vehicle speed to the LSP control system 12. The LSP control system 12 includes a comparator 28 which compares the target speed 38 selected by the user with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels, or for a reduction in torque to be applied to the vehicle wheels, depending on whether the vehicle speed needs to be increased or decreased to maintain the speed that has been selected by the user.

An output 42 from the evaluator unit 40 is provided to the driveline for the vehicle wheels 111-115 so as to either increase or decrease the torque applied to the wheels, depending on whether there is a positive or negative demand for torque from the evaluator unit 40. In order to initiate the necessary positive or negative torque being applied to the wheels, the evaluator unit 32 may either command that additional power is applied to the vehicle wheels or that a braking force is applied to the vehicle wheels, either or both of which may be used to implement the change in torque that is necessary to maintain the target vehicle speed. In the illustrated embodiment the torque is applied to the vehicle wheels individually so as to maintain the target vehicle speed, but in another embodiment torque may be applied to the wheels collectively to maintain the target speed.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 16 so that automatic control of the vehicle speed by the on-highway cruise control system 16 is suspended or cancelled. However, the LSP control system 12 is not arranged to cancel or suspend operation in dependence on receipt of a wheel slip signal 48 indicative of wheel slip, rather, the system 12 is arranged to monitor and subsequently manage wheel slip so as to keep driver workload to a minimum. During a slip event, the LSP control system 12 continues to compare the measured vehicle speed with the desired vehicle speed as input by the user, and continues to control automatically the torque applied across the vehicle wheels so as to maintain vehicle speed at the selected value. In this way the LSP control system 12 is therefore configured differently to the cruise control system 16, for which a wheel slip event has the effect of overriding the cruise control function so that manual operation of the vehicle must be resumed, or the cruise control function re-set.

A further embodiment of the invention (not shown) is one in which the vehicle is provided with a wheel slip signal 48 derived not just form a comparison of wheel speeds, but further refined using sensor data indicative of the vehicle's speed over ground. Such speed over ground determination may be made via global positioning (GPS) data, or via a vehicle mounted radar or laser based system arranged to determine the relative movement of the vehicle and the ground over which it is travelling.

At any stage of the LSP control process the user can override the function by applying the accelerator and/or the brake to adjust the vehicle speed in a positive or negative sense. However, in the event that a wheel slip event is detected via signal line 48, no action is taken by the LSP control system 12 to suspend the LSP process. As shown in FIG. 5, this may be implemented by providing a wheel slip event signal to the LSP control system 12 which is then managed by the LSP control system 12 and does not result in suspension or other disablement of the LSP control process.

A wheel slip event is triggered when a loss of traction occurs at any one of the vehicle wheels. Wheels and tyres may be more prone to losing traction when travelling on snow, ice or sand, for example, or in environments where the terrain is more uneven or slippery compared with driving on a highway in normal on-road conditions. The invention therefore finds particular benefit when the vehicle is being driven in an off-road environment, or in conditions in which wheel slip may commonly occur, and where manual operation by the user can be a difficult and often stressful experience and may result in an uncomfortable ride, because it enables continued progress to be made at a low target speed without the need for user intervention. The invention is also beneficial when employed in low-speed congested traffic situations as it reduces fatigue for the user due to repeated start/stop pedal actions.

The LSP control system 12 is inoperable above vehicle speeds in excess of a predetermined threshold speed of for example 30 mph. So, for example, if the user selects the LSP control system 12 when the vehicle is travelling above 30 mph, an alert is displayed to the user via the LSP HMI 20 that the LSP control system cannot be activated. Once the vehicle speed reduces to below 30 mph, however, the LSP control system 12 is initiated automatically without the user having to select LSP control again. In other words, the LSP control system 12 is held in a wait state pending the speed of the vehicle reducing to a level below that of the threshold speed.

The LSP control system 12 may be configured so that, if the user operates the LSP HMI 20 to initiate operation of the system whilst the vehicle is travelling at a speed between a first, lower threshold speed and a second, higher threshold speed, the system registers that the user wishes to initiate LSP control but does not initiate LSP control until the vehicle speed has reduced to a level below the first, lower threshold speed.

A further embodiment of the invention (not shown) is one in which the vehicle is provided with an on-board detection system such as a radar system or other range detection means, which monitors for obstacles or lead vehicles in front of the vehicle and uses the information that is fed-back from the radar system to maintain a safe distance to the lead vehicle.

The vehicle is also provided with additional sensors (not shown) which are representative of a variety of different parameters associated with vehicle motion and status. These may be inertial systems unique to the speed control system or part of an occupant restraint system or any other subsystem which may provide data from sensors such as gyros or accelerometers that may be indicative of vehicle body movement and may provide a useful input to the LSP control system 12. The signals from the sensors provide, or are used to calculate, a plurality of driving condition indicators (also referred to as terrain indicators) which are indicative of the nature of the terrain conditions over which the vehicle is travelling. The signals are provided to the VCU 10 which determines the most appropriate control mode for the various subsystems on the basis of the terrain indicators, and automatically controls the subsystems accordingly. This aspect of the invention is described in further detail in our co-pending patent application nos. GB1111288.5, GB1211910.3 and GB1202427.9, the contents of each of which is incorporated herein by reference.

The sensors (not shown) on the vehicle include, but are not limited to, sensors which provide continuous sensor outputs to the VCU 10, including wheel speed sensors, as mentioned previously and as shown in FIG. 5, an ambient temperature sensor, an atmospheric pressure sensor, tyre pressure sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor on the stability control system (SCS), a brake pedal position sensor, an acceleration pedal position sensor, longitudinal, lateral and vertical motion sensors and water detection sensors in particular forming part of a vehicle wading assistance system (not shown).

In other embodiments, only a selection of the aforementioned sensors may be used. The VCU 10 also receives a signal from the electronic power assisted steering unit (ePAS unit) of the vehicle to indicate the steering force that is applied to the wheels (steering force applied by the user combined with steering force applied by the ePAS system).

The VCU 10 evaluates the various sensor inputs to determine the probability that each of a plurality of different control modes for the vehicle subsystems is appropriate, with each control mode corresponding to a particular terrain type over which the vehicle is travelling (for example, mud and ruts, sand, grass/gravel/snow). The VCU 10 then selects which of the control modes is most appropriate and controls various vehicle parameters accordingly.

The nature of the terrain over which the vehicle is travelling may also be utilised in the LSP control system 12 to determine an appropriate increase or decrease in drive torque to be applied to the vehicle wheels. For example, if the user selects a target speed that is not suitable for the nature of the terrain over which the vehicle is travelling, for example for safety reasons, the system is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system selects a speed that differs from the user-selected target speed, a visual indication of the speed constraint is provided to the user via the LSP HMI 20 to indicate that an alternative speed has been adopted.

The speed control system may be operable to allow a user to reduce the set speed by user actuation of a vehicle brake control.

By vehicle brake control is meant a control by means of which a user may apply a foundation braking system. The brake control may for example comprise a brake pedal. The foundation braking system may include a friction braking system and optionally a regenerative braking system. In some embodiments the foundation braking system may comprise a regenerative braking system in place of or in addition to a friction braking system.

In conventional cruise control systems for highway driving a control for changing the set speed of a cruise control system is typically provided in the form of a '+/−' button mounted on or adjacent to a steering wheel of the vehicle. In vehicles operating in off-highway conditions, a user may be required to perform relatively rapid rotations of the steering wheel and/or rotate the wheel through relatively large angles whilst negotiating difficult terrain. As such it may be difficult for the user to manipulate the '+/−' buttons at the same time. Furthermore, the user might inadvertently depress the wrong button, changing the set speed. Embodiments of the present invention have the advantage that a control by means of which the set speed may be changed may be provided separately from the steering wheel. Furthermore, the control for changing the set speed may be controlled by a foot of the user rather than by hand, leaving the user's hands free to continue steering the vehicle.

By employing the brake pedal to reduce the set speed, a relatively intuitive means may be provided to enable the user to change the set speed.

The speed control system may be operable to allow a user to enable or disable adjustment of off-highway speed control set speed by means of a brake and/or accelerator control. This functionality may be provided via an HMI display or the like, The control means may be operable to allow the user to reduce the set speed by user actuation of the brake control by applying a force that is within a prescribed range of force or translating the control by an amount that is within a prescribed range of travel. The range of pressure or travel required to reduce the set speed may be less than that required to apply the foundation braking system. That is, the range may be within a 'dead band' of pressure or stroke. Alternatively, the range may include values sufficient to cause application of the foundation braking system. In some embodiments where the range includes values sufficient to cause application of the foundation braking system, in the event the user applies pressure in the prescribed range or effects translation within the prescribed range sufficient to actuate the foundation braking system, the speed control system may be operable to compensate for the braking torque applied when the foundation braking system is applied by application of increased powertrain torque. Other arrangements are also useful.

It is to be understood that the prescribed range of values of pressure may be from a first value of pressure to a second value of pressure where the first and second values are greater than zero. In some embodiments the prescribed range may be from a value that is above zero but less than or equal to a second value that is greater than zero.

The control means being operable to allow a user to increase the set speed by user actuation of a vehicle accelerator control.

The accelerator control may for example comprise an accelerator pedal.

The control means may be operable to allow the user to increase the set speed by user actuation of the accelerator control by applying a force that is within a prescribed range of pressures or by translating the control by an amount that is within a prescribed range of travel. The range of force or travel required to increase the set speed may be less than that required to increase the amount of power developed by a powertrain. That is, the range may be within a 'dead band' of force or stroke. Alternatively, the range may include values sufficient to cause an increase in the amount of power developed by the powertrain. In some embodiments where the range includes values sufficient to cause an increase in the amount of power developed by the powertrain, in the event a user applies force in the prescribed range or effects translation within the prescribed range sufficient to cause an increase in powertrain torque, the speed control system may be operable to compensate for the increased torque applied by the powertrain by application of the foundation braking system. Other arrangements are also useful.

Advantageously the system may be further operable to allow a user to decrease the set speed by user actuation of a vehicle brake control, such as a brake pedal.

Optionally, the control means may be configured wherein if the user actuates the brake control by applying pressure having a value that is within a prescribed range of values and/or by translating the control by an amount within a prescribed range for longer than a prescribed period of time the control means may be configured gradually to reduce the set speed in incremental steps during the period for which the user actuates the brake control within the prescribed range.

It is to be understood that if the user actuates the brake control by applying a pressure greater than a prescribed pressure and/or by more than a prescribed amount of travel the speed control system may be operable to cancel speed control mode and a foundation braking system may be applied in the conventional manner. Thus in a motor vehicle having a speed control system according to the present invention installed therein a foundation braking system may be configured to operate independently of the speed control system such that the vehicle responds to brake control inputs in the same manner whether or not speed control mode is selected. Thus, it is envisaged that in some embodiments of the present invention standard accelerator and brake control inputs will always take priority over any autonomous control system or control means when brake control pressure or travel exceeds a prescribed value, and cancel speed control if user behaviour indicates the user wishes to cancel speed control.

In some arrangements the prescribed pressure and/or prescribed amount of travel above which the foundation braking system is applied may correspond to that above which the foundation braking system is applied when speed control is not selected. This feature has the advantage that the user experiences the same response of the foundation braking system to brake control inputs whether or not speed control mode is selected.

In some arrangements any dead band present in brake and/or accelerator control travel may be increased artificially when off-highway speed control is operational.

If the speed control system (or any other controller such as a brake controller) detects that a rate of travel of the brake pedal, or a rate of increase of pressure applied to the brake pedal exceeds a prescribed rate even whilst still within the dead band, a braking system of the vehicle may be commanded to be applied. This feature has the advantage that a speed at which a braking system is able to respond to an emergency braking control input may be increased.

Advantageously the system may be further operable to allow a user to increase the set speed by user actuation of a vehicle accelerator control.

Advantageously the speed control system is operable in an off highway condition and a highway condition. The off highway (or 'off road') condition may be referred to as a progress control system or low speed progress control system. The on-highway condition may be referred to as a cruise control system. Other arrangements are also useful.

Optionally the speed control system may be operable to allow a user to reduce the set speed by user actuation of the vehicle brake control (and optionally increase set speed by user actuation of the vehicle accelerator control) only when operating in the off highway condition. Alternatively the speed control system may be operable to allow a user to reduce the set speed by user actuation of the vehicle brake control (and optionally increase set speed by user actuation of the vehicle accelerator control) when operating in either the off highway condition or the highway condition, e.g. when in a low speed progress control condition or an on highway cruise control condition. It is to be understood that embodiments of the invention are also suitable for use in vehicles not having an off highway operating condition or vehicles not having an on highway cruise control system.

It is to be understood that control of set speed by means of a brake control and/or an accelerator control may be arranged to occur only in off-highway speed control in some embodiments.

The method may comprise reducing automatically a set speed of the vehicle in dependence on user actuation of a vehicle brake control and/or increasing automatically a set speed of the vehicle in dependence on user actuation of a vehicle accelerator control.

It is to be understood that if the set speed is decreased the speed control system may be operable to change a gear ratio of a transmission in order to ensure sufficient drive torque is available to negotiate an obstacle. The speed control system may be operable to increase the gear ratio.

Thus, in some arrangements as the user decreases the set speed an engine speed may increase, for example if the set speed falls below a prescribed value such as 5 km/h or any other suitable speed. Reduction in set speed may signify that a user intends to negotiate an obstacle such as a boulder, a steep incline or other obstacle.

It is to be understood that by enabling a user to change the set speed of the speed control system by means of relatively light pedal inputs, the vehicle may be driven off road at low speed (for example below 50 km/h) without the user needing to manually manipulate a speed setting control on the steering wheel. This greatly reduces user workload and makes vehicle operation with speed control active more intuitive. Embodiments of the invention also enable de-cluttering of switch packs on or around the steering wheel or other steering control of the vehicle. It is to be understood that in some scenarios it is vital that a user's attention is not distracted from the terrain on which the vehicle is being driven. By eliminating the requirement for the user to focus their attention inside the vehicle when changing the set speed, for example by manipulating hand or finger controls within the vehicle, an improved user experience may be achieved.

In an embodiment, if the user initiates speed control and the vehicle is travelling below a threshold speed and/or the vehicle has been set to an off road driving mode (for example by selection of a terrain response (TR) mode or selection of a low-ratio gear), or if the vehicle otherwise determines that it is being driven off road, then the speed control system will operate in an off-road condition (or mode) and accept set speed adjustment commands via brake and/or accelerator controls such as brake and/or accelerator pedals as described above whilst remaining in a speed control active condition.

In some arrangements, if the user initiates speed control whilst the vehicle is travelling above a predetermined speed and/or is being driven on the road (as indicated by a 'high' gear ratio selected as opposed to 'low' gear ratio) or if the terrain response (TR) mode is deselected (in some embodiments a 'special programs off' TR mode is selected), the speed control system may only accept speed adjustments by means of hand-operated controls typically located on or adjacent a steering wheel of the vehicle. If the user presses the brake pedal, even lightly, during speed control operation (in the on-road or on-highway condition) then speed control operation is suspended and the vehicle will start to coast until the user presses the throttle pedal or re-activates speed control via a hand operated switch.

The user may adjust the speed of the vehicle whilst traveling in the off-highway speed control condition either by pressing the brake pedal (in order to reduce the set speed) or by pressing the accelerator pedal (in order to increase the set speed).

The control means may be operable to allow a user to change the set speed by user actuation of a foot pedal. The system may be operable to decrease the set speed by user actuation of the brake pedal. In addition or instead the system may be operable to increase the set speed by user actuation of an accelerator pedal.

Figure 6:
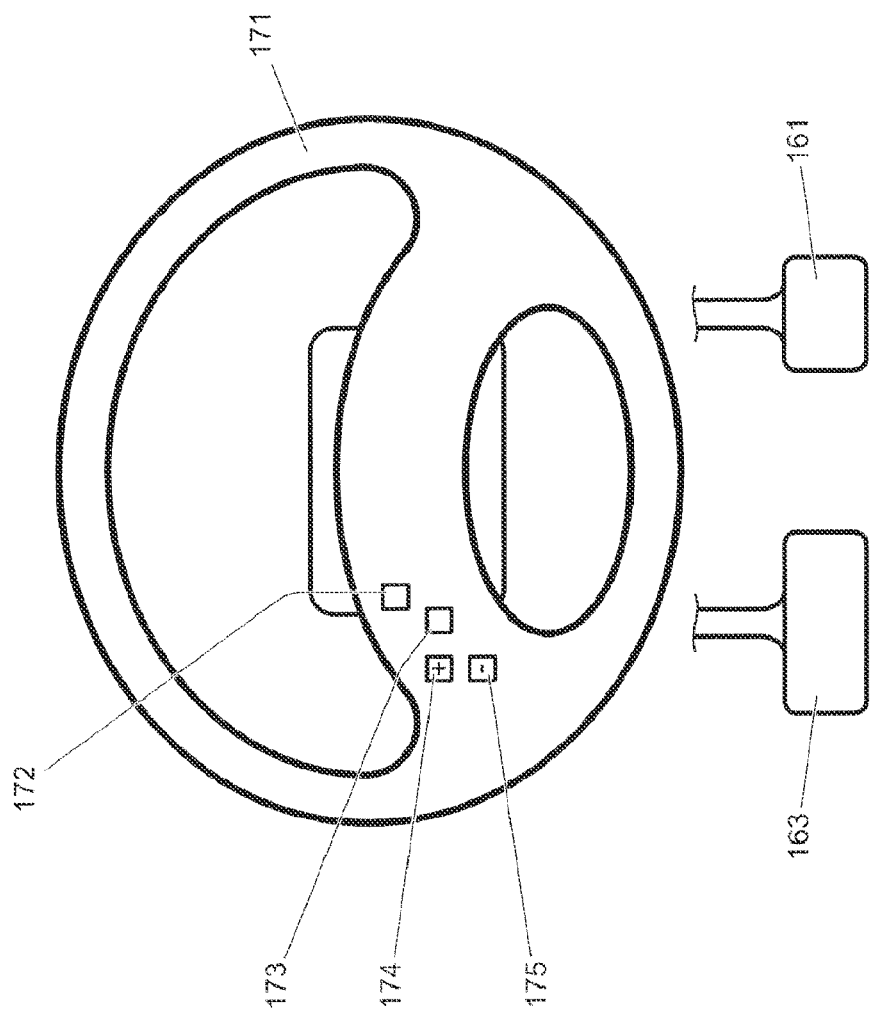
FIG. 6 illustrates a steering wheel and brake and accelerator pedals of a vehicle according to an embodiment of the present invention.

FIG. 6 shows the steering wheel 171 of the vehicle 100 of FIG. 1 in more detail, together with the accelerator and brake pedals 161, 163. As in the case of a conventional vehicle, the steering wheel 171 has a 'set-speed' control 173 depression of which enables a user to activate a speed control system to maintain the current vehicle speed. The wheel 171 also has a 'LSP' control activation button and a resume button. The resume button may be used to control both an 'on-highway' cruise control system when driving on road, and the LSP control system 12 when driving off-road. The LSP control button is used to activate the LSP control system 12 and the resume button used to command the system 12 to control the vehicle 100 to resume the previously set (user defined) set speed.

The system 12 may be provided with a memory arranged to store previously set, user defined set speeds in addition to that which was last set be the user. In this way, the user may quickly access more than one set speed via the resume button or other appropriate control. In this embodiment, the user may be operating the vehicle at a set speed of 10 mph, but choose to reduce this to 6 mph to negotiate an obstacle off-road. The system 12 is arranged to store both 6 mph and 10 mph, such that if the system 12 intervenes and reduces the speed further to 4 mph, the user may request the system to accelerate to 6 mph with a single press of the resume button, or 10 mph with a double press of the resume button. The system 12 may be provided with means to display the stored set-speeds to the user, for example by illuminated markers or chaplets arranged at appropriate locations around a speedometer. In such an example, the system 12 may be arranged to independently or in conjunction with TR mode setting, prevent the user accessing pre-set speeds from the memory and applying them if it is determined they would be too fast for the terrain over which the vehicle is presently moving. Instead, the system 12 may be arranged to accelerate up to the highest speed it determined appropriate for the terrain and will continue to accelerate towards the chosen set-speed as the terrain permits. In this example, the system 12 will manage the acceleration of the vehicle within a predefined acceleration corridor, for example from 0.1 to 0.2 g. The system 12 may be provided with means to indicate to the user the current status and that the system 12 is working to resume the user defined set speed once it becomes appropriate for the terrain. The system 12 is arranged to permit the user to override the system 12 at any time in the aforementioned manner.

If the vehicle is operating on-highway, depression of set-speed control 173 causes the cruise control system 16 to activate provided the current vehicle speed exceeds 50 km/h. Depression of the '+' control 174 causes the cruise control system 16 to increase the set-speed whilst depression of the '−' control 175 causes the cruise control system 16 to decrease the set-speed. It will be appreciated that '+' and '−' controls may be on a single button.

If the vehicle is operating off-highway, depression of set-speed control 173 causes the LSP control system 12 to activate and operate as described above.

The system may further comprise a 'cancel' button operable to cancel speed control by the LSP control system 12. In some embodiments, the LSP system may be in either one of an active condition or a standby condition. In some embodiments the LSP control system 12 may be operable to assume an intermediate condition in which vehicle speed control by the LSP control system 12 is suspended but a hill descent control (HDC) system of the like may remain active if already active. Other arrangements are also useful.

With the LSP control system 12 active, the user may increase or decrease the vehicle set speed by means of the '+' and '−' buttons 174, 175. In addition, the user may also increase or decrease the vehicle set speed by lightly pressing the accelerator or brake pedals 161, 163 respectively. In some embodiments, with the LSP control system 12 active the '+' and '−' buttons 174, 175 are disabled.

Figure 7:
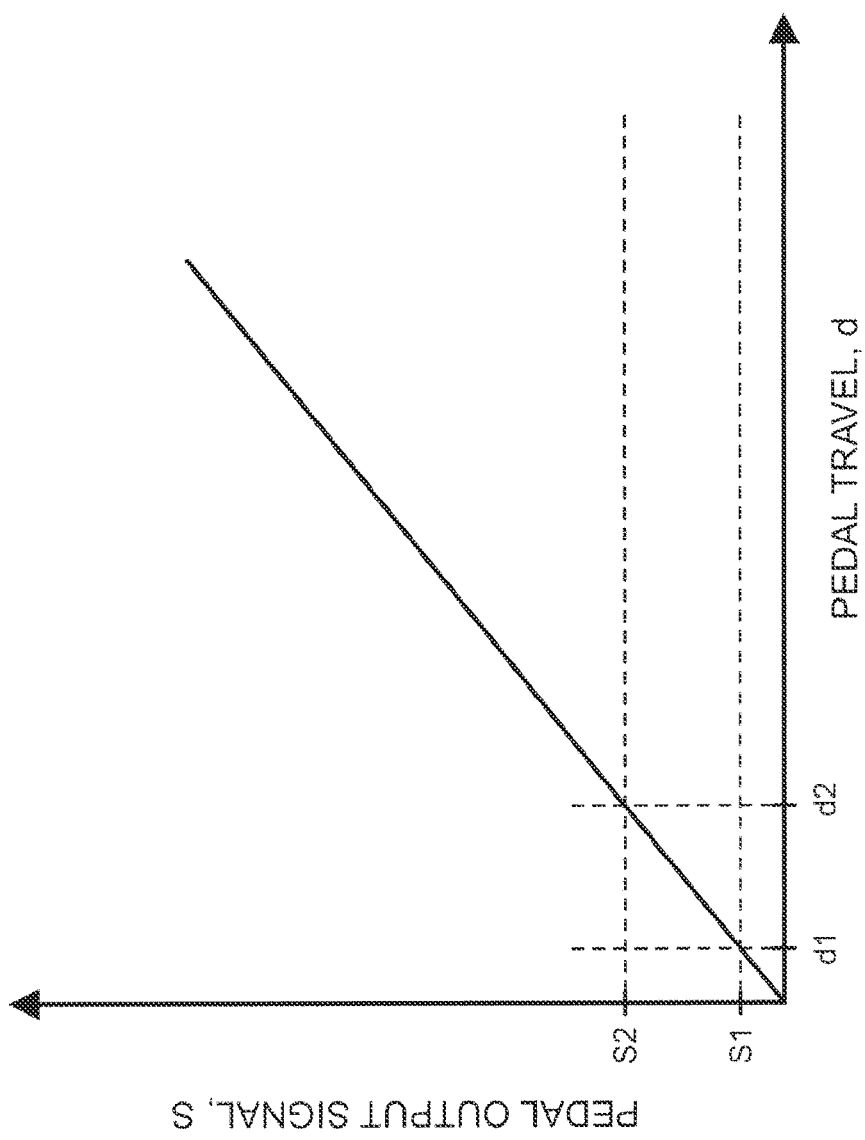
FIG. 7 shows a plot of pedal output signal S as a function of pedal travel d in a vehicle according to an embodiment of the present invention.

FIG. 7 is a plot of pedal output signal, s, as a function of accelerator or brake pedal travel, d, being the amount by which the pedal 161, 163 has been pressed (measured for example in terms of linear translation or angular rotation or a proportion of full scale deflection). In the arrangement shown the pedal output signal increases in a substantially linear manner as a function of travel although other arrangements are also useful. In response to the pedal output signal, a braking system 22 is operable to apply brakes of the vehicle 100 and the VCU 10 is operable to change the amount of torque developed by the engine 121. In the present embodiment, the braking system 22 is arranged not to apply the brakes of the vehicle and the VCU 10 is arranged not to change the amount of torque developed by the engine 121 unless the amount of pedal travel exceeds a threshold distance d2 illustrated in FIG. 7.

The LSP control system 12 is operable to monitor pedal input signals from the accelerator and brake pedals 161, 163. If the amount of pedal travel meets the condition $d1 \le d \le d2$ where $d1 > 0$, the LSP control system 12 is operable to increase or decrease the LSP control system set-speed. If the accelerator pedal travel meets this condition the LSP control system 12 increases the set-speed whilst if the brake pedal travel meets this condition the LSP control system 12 decreases the set-speed.

In some arrangements, one or both of the values of d1 and d2 may be different for the accelerator and brake pedals 161, 163 respectively.

In some arrangements, a vehicle 100 may be configured such that if a '−' button or like control is used to reduce speed rather than a brake control, the speed control system allows a vehicle speed to reduce at least initially by coasting rather than application of a braking system or other retarding torque means, with application of a braking system only if the speed control system determines that such action is required. In contrast, if a brake control is applied such as brake pedal 163 in order to reduce set speed, at least a light braking force may be applied in some embodiments whilst the pedal 163 is depressed. Thus, reduction in set speed by means of the brake pedal 163 may result in a more rapid reduction in vehicle speed since a brake torque is applied as soon as the brake pedal 163 is depressed to reduce vehicle set speed, rather than after the speed control system has determined that a brake torque is required in order to reduce speed to the new user-selected set speed.

It is to be understood that reference herein to a '+' or '−' control is not to be understood as limiting to a control placarded with such symbols. Rather, a '−' control may be understood to include a control other than a brake control for reducing set speed whilst a '+' control may be understood to include a control other than an accelerator control for increasing set speed. The '+' and '−' controls may be manually operated, for example by a user's hand.

Embodiments of the present invention enable enhanced user enjoyment of a vehicle when driving in off-highway conditions.

The control means may be operable to allow a user to change the set speed in response to user actuation of a control, the system being operable to provide haptic feedback to the user in response to user actuation of the control by an amount sufficient to change the set speed.

Advantageously the control comprises a foot operated pedal. In some embodiments the foot pedal is operable to provide haptic feedback only when the vehicle is in an off-highway or off-road speed control condition or mode. In such a condition, the speed control system may be configured to enable the vehicle to maintain a relatively low set speed (for example a speed less than 50 km/h, such as a speed in the range from 5-10 km/h), even if one or more wheels are slipping due to loss of traction. For example, in some embodiments the off-road speed control system may remain operational even in the presence of an amount of wheel slip sufficient to cause activation of a vehicle stability control system or the like. Conventional on-highway speed control systems are limited to operation at a minimum speed (typically around 50 km/h) and automatically cancel if wheel slip sufficient to cause intervention by a stability control system is detected.

In some arrangements, if the user actuates the control beyond the range of positions or applied pressures (the 'haptic zone'), the speed control system is arranged to cancel automatic speed control. Control of vehicle speed therefore reverts to the user. It is to be understood that the haptic feedback provided by the speed control system may be arranged to be different from that associated with an anti-lock braking system (ABS) operation so that a user may readily distinguish between the two. The haptic feedback may for example provide pulses, vibrations and/or sounds at a different amplitude and/or frequency to those associated with ABS operation.

In addition or instead, in some arrangements the haptic zone may be identified by means of an increase in resistance to pedal movement as a user applies pressure to a brake pedal or a force to an accelerator pedal. The increase may be provided throughout the haptic zone. In some embodiments an increase in resistance may be presented before an amount of travel of the pedal or an amount of pressure or force applied to the pedal is sufficient to result in exiting of the haptic zone.

In some arrangements one or more audible clicks, tones or pulses may be generated when the control is in the haptic zone. HMI (human machine interface) feedback may also be provided to a user in response to actuation of the control in the haptic zone with the speed control system operational. In some embodiments haptic feedback in respect of set speed change may be provided only when the speed control system for which the control may be used to change set speed is operational.

Arrangements of the present invention have the advantage that a user does not need to employ a brake or accelerator pedal in order for a vehicle to maintain progress across terrain. Rather, the off-highway speed control system may control automatically a powertrain and braking system in order to maintain progress. In some embodiments the off-highway speed control system may be operable to cancel when a brake pedal is depressed by more than a prescribed amount.

Whilst a speed control system is operating in an off-highway speed control condition, depression of a brake pedal by an amount that is non-zero but below a prescribed applied pressure or amount of travel may result in a reduction in vehicle set speed associated with the speed control system without application of a vehicle braking system and without cancelling the off-highway speed control condition. It will be appreciated this may be particularly useful where the pedal is not isolated or otherwise disconnected from the foundation braking system when off-highway speed control functionality is in operation. Other arrangements are also useful. In some embodiments depression of an accelerator pedal by an amount greater than zero but below a prescribed applied force or amount of travel results in an increase in vehicle set speed.

As noted above, a change in vehicle set speed when a foot pedal is depressed may be arranged to occur only when the vehicle is operated in the off-highway speed control condition or mode.

When the user depresses the brake pedal he or she may be reminded that the vehicle is in the off-highway condition. If the user depresses the brake pedal by a sufficiently large amount of travel or applies a sufficiently high pressure, the pedal will 'push through' the haptic band and cause a suspension/cancellation of the off-road speed control mode.

It is to be understood that when traveling over rough terrain it may be difficult to know how much pressure to apply to a brake or force to apply to an accelerator pedal to change the set speed. Accordingly, the provision of haptic feedback enables a user to determine positively that the amount of pressure applied to the brake pedal (and/or force to the accelerator pedal) is sufficient to cause the set speed to change.

Haptic feedback may be provided to the user via the foot pedal the user is depressing (such as a brake or accelerator pedal), by means of a steering wheel, a user's seat or any other suitable means of providing a user with a haptic experience.

A user is able to determine how much to press a brake and/or accelerator pedal in order to change the set speed of a speed control system without causing the off-road speed control condition to cancel.

With reference to FIG. 7, if a user depresses a brake pedal 163 by an amount of travel in the range from d1 to d2 such that the pedal output signal s has a value in the range from s1 to s2, the LSP control system 12 is operable to reduce the user selected set speed and provide haptic feedback to the user by applying a vibrational excitation to the brake pedal 163. If the brake pedal output signal s is in the range from s1 to s2 for less than a prescribed period of time (such as 1 s), the value of set speed is decremented by a prescribed amount (in the present embodiment 1 km/h or 1 mph depending on user choice of units). If the brake pedal output signal is in the range from s1 to s2 for more than a prescribed amount of time (in the present case, more than 1 s), the set speed is decremented in steps, for example by 1 km/h or 1 mile/h per 500 ms or other time period. Alternatively the rate of deceleration may be set to an arbitrary rate. Other arrangements are also useful, and other lengths of time are also useful. The LSP control system 12 may be configured such that the brake pedal 163 must be depressed for longer than a prescribed period (which may be any suitable value, for example 100 ms) before a decrement in set speed takes place.

Conversely, if the accelerator pedal 163 is depressed such that the accelerator pedal output signal is in the range from s1 to s2, the value of set speed is incremented. If the accelerator pedal output signal is in the range from s1 to s2 for more than a prescribed amount of time, for example 1 s in some embodiments, the set speed is incremented in steps, for example by 1 km/h or 1 mile/h per 500 ms or other time period. Alternatively the rate of acceleration may be set to an arbitrary rate. Other arrangements are also useful. The LSP control system 12 may be configured such that the accelerator pedal 161 must be depressed for longer than a prescribed period (which may be any suitable value, for example 100 ms) before an increment in set speed takes place.

In one arrangement the system may be operable to allow a user to increase or decrease the set speed from a current set speed to a target set speed. Thus when the user commands a change in set speed the speed control system may control the means for applying torque in such a manner as to allow the vehicle automatically to accelerate (in a positive or negative sense) to achieve the new set speed.

The means for applying torque may comprise a powertrain and optionally a braking system, as will be described in more detail below.

In changing the speed of the vehicle to match the new set speed, the system may be operable to detect and take into account an external force acting on the vehicle in such a manner as to accelerate the vehicle (in a positive or negative sense). The speed control system may compensate for the presence of the external force when changing the amount of torque commanded to be applied to the one or more wheels so as to reduce a risk of overshoot of the new target set speed. In some embodiments the system may be operable substantially to prevent overshoot of the new target set speed. The speed control system may be operable to control a powertrain and optionally a braking system. It is to be understood that in some embodiments a powertrain may comprise means for applying relatively rapidly a negative torque to one or more wheels, for example by means of one or more electric machines, for example one or more electric machines operable as electrical generators, without a requirement for a friction braking system to be deployed.

It is to be understood that an external force acting on a vehicle to accelerate the vehicle may be a retarding force acting to cause negative acceleration of the vehicle (i.e. decelerate the vehicle) or a force acting in such a manner as to cause positive acceleration of the vehicle.

It is to be understood that a force acting to accelerate a vehicle in a positive or negative manner may be a force having a component acting in a direction parallel to or along a direction of travel of the vehicle. In the case of a vehicle travelling uphill the force may act in a direction opposite the direction of travel and therefore be a retarding force. In some embodiments the normal direction of travel (i.e. when the vehicle is experiencing substantially zero side slip or yaw) may be arranged to be parallel to or along a longitudinal axis of the vehicle.

The speed control system may be operable to increase or decrease the amount of torque commanded to be applied to one or more wheels so that the amount of torque increases or decreases at a rate that is dependent on the size of the external force. Thus in some embodiments the greater the external force (such as a retarding force or a force causing positive acceleration) the slower the rate at which the amount of torque applied to one or more wheels by the means for application of said torque is commanded to change.

A positive accelerating force may for example be experienced in the case the vehicle is descending a slope, and a negative force if the vehicle is ascending a slope.

In some embodiments the system is provided with data in respect of at least one selected from amongst a gradient of a driving surface (for example by reference to an attitude of the vehicle), gear selection, tyre friction, wheel articulation. rolling resistance and a selected terrain response mode of the vehicle in addition to wheel speed.

In some embodiments in which driving surface gradient information is provided the system may be operable to control a rate at which the amount of torque applied to one or more wheels changes in dependence on the magnitude and direction of the force acting to accelerate or decelerate the vehicle.

In some embodiments, in the case the vehicle experiences an external force acting in a direction to positively accelerate the vehicle in the direction of travel, the speed control system may be operable to reduce the rate at which the means for applying torque changes the amount of applied torque when an increase in set speed is commanded, the rate being reduced by an amount that is greater as the size of the external force increases. Thus overshoot of the (new) target set speed (where the vehicle speed exceeds the set speed) may be reduced or prevented. It is to be understood that in the case of a vehicle descending a slope, the steeper the gradient, the greater the component of gravitational force tending to cause positive acceleration and therefore less accelerating torque is required from the means for applying torque to the one or more wheels. The means for applying torque may comprise an engine, an electric machine or any other suitable means for applying drive torque to one or more wheels.

It is to be understood that in some situations an increase in powertrain torque may be required in order to accelerate the vehicle to the new set speed within a defined acceleration corridor (for example at a rate in the range from 0.1 to 0.2 g). In some situations where a gradient is particularly steep, a decrease in brake torque may be required in order to accelerate the vehicle with a value of acceleration that is within the prescribed corridor of values. In either case, the rate of change of powertrain torque and/or braking torque may be arranged to decrease with increasing gradient.

Conversely, where a force acting on a vehicle is such as to cause positive acceleration, if a decrease in set speed is requested the speed control system may be operable to change the amount of torque applied to one or more wheels at a rate that increases as the size of the external force increases. This is because the external force is acting in direction that opposes a reduction in the set speed.

In a situation where a vehicle is experiencing a force in a direction such as to cause negative acceleration in the intended direction of travel, for example in an uphill direction against gravity, or over sandy terrain against drag due to the composition of the terrain, the speed control system may be operable to increase a rate at which torque applied to the one or more wheels is increased when an increase in set speed is requested, and to decrease the rate at which torque applied to the one or more wheels is decreased when a decrease in set speed is requested, in order to maintain vehicle acceleration within the prescribed corridor of values.

In other words, in the event that a decrease in set speed is commanded whilst the vehicle is ascending a slope (where a retarding force is acting on the vehicle) the system may be configured to reduce the rate at which wheel torque is decreased in order to reduce a risk that a vehicle has insufficient wheel torque to overcome the gradient, resulting in the vehicle tending to move backwards down the slope. It is to be understood that if wheel torque is decreased by too great an amount (for example a reduction to zero) whilst ascending a relatively steep slope, a drop in vehicle speed may undershoot excessively the new target set speed, i.e. fall below the new target speed. In some situations a vehicle may even move backwards down the slope as described above. Accordingly, wheel torque is decreased more slowly compared with driving on level ground.

In some embodiments, if the vehicle is descending a slope and an increase in set speed is required, the system may be operable to change the amount of torque applied to one or more wheels at a rate that decreases as a function of increasing gradient.

In some embodiments, the vehicle may be configured to control the rate at which wheel torque is changed responsive to an amount of an external force that is determined to be acting on the vehicle due to a type of terrain or environment over which or through which the vehicle is travelling. It is to be understood that terrain such as sand, mud, water or the like may apply a relatively large retarding force to a vehicle. Wading through a body of water may result in application of a force tending to accelerate or decelerate the vehicle, depending on whether the body of water is stationary or moving in a direction having a component acting along a direction of intended travel (with or against the direction of travel). If the vehicle is travelling over a level, sandy or muddy surface and a decrease in set speed is commanded the system may be operable to change the amount of torque applied to one or more wheels in order to reduce the vehicle speed to the new set speed at a rate that decreases as the amount of drag acting on the vehicle increases.

It is to be understood that if the amount of powertrain torque is decreased too rapidly, drag acting on the vehicle may reduce the speed of the vehicle by an amount (and at a rate) that may result in discomfort to one or more occupants and may result in stopping of the vehicle. Once the vehicle is stopped it may be difficult to enable the vehicle to begin to move again from rest.

Conversely, if an increase in vehicle set speed is requested, the speed control system may be operable to command an increase in powertrain torque at a rate that increases with the amount of drag acting on the vehicle. This is because powertrain torque must overcome a drag force tending to oppose vehicle acceleration as well as vehicle inertia in order to achieve the new set speed.

It is to be understood that this feature has the advantage that the vehicle may progress over terrain more reliably and with greater composure than a vehicle not having a speed control system according to the present invention and enable a new set speed to be attained relatively quickly regardless of an amount of force acting to oppose or promote vehicle motion across a surface, enhancing user confidence in the system.

In one arrangement the system may be operable to allow a user to increase or decrease the set speed from a current set speed to a target set speed, the system being operable to take into account an external force acting on the vehicle to accelerate the vehicle when changing the amount of torque commanded to be applied to the one or more wheels thereby to reduce overshoot or undershoot of the target set speed.

The means for applying torque may comprise a powertrain and optionally a braking system.

When the speed control system is operating in an off highway speed control mode, the system may be configured to accept a light press of the brake pedal as being indicative of the user's desire to remain in speed control mode but at a reduced speed, whereas a firm press on the brake pedal may indicate that the user wishes to bring the vehicle out of speed control mode and set speed control to a suspended state until re-activated. In this way, the vehicle may be driven off-road at low speed (for example <50 km/h) without the user needing to touch the pedals, or repeatedly operate controls on the steering wheel. This greatly reduces user workload and improves vehicle composure. It is to be understood that it is often difficult to maintain a constant light pressure on a foot pedal when driving over rough ground as the user often uses their feet to support/steady themselves as the vehicle negotiates off-road obstacles such as ruts or potholes.

It is envisaged that the off-road speed control system may form part of an ATPC (All-Terrain Progress Control) system, which may be arranged to work independently of, or in conjunction with, one or more vehicle control systems arranged to optimise vehicle configurations for a given terrain over which the vehicle is travelling. An example of such a system may be a Terrain Response™ system.

In one embodiment of the proposed speed control system, if the user initiates speed control and the vehicle is travelling below a threshold speed and/or the vehicle has been set to an off-road driving mode (for example via a TR mode selection or selection of a low-ratio gear), or if the vehicle otherwise determines that it is being driven off-road, then the speed control system will operate in an off-road mode and will accept speed adjustment commands via the brake and accelerator pedals whilst remaining in a speed control active mode.

The off-road speed control system may be provided with at least one selected from amongst information in respect of a vehicle's attitude, wheel speed, wheel articulation, gear selection, tyre friction, rolling resistance and selected TR mode. It is to be understood that if the user is using off-road speed control to travel off-road at a slow speed, say 5 km/h, and the vehicle is travelling up a steep incline, when the user requests a reduction in cruising set-speed, there may be insufficient torque to maintain progress unless the system takes drag/load-inducing factors into account such as the steepness of the gradient up which the vehicle is travelling. In this way, the off-road speed control system may predict that the requested reduction in speed may result in the moving backwards down the slope, in which case the torque may be reduced more gradually as the steepness of the slope increases. It is to be understood that this is because a slight reduction in torque supplied to the wheels will result in a greater reduction in vehicle speed when ascending a slope than if the vehicle were driving over level ground. In this way, the torque may be accurately controlled in order to achieve a desired set-speed regardless of the gradient and terrain over which the vehicle is travelling. This ensures that vehicular response is intuitive and as expected by the driver who may be inexperienced in off-road driving.

If the vehicle user brings the vehicle to a halt or near stand-still on a steep hill whilst operating the vehicle in off-road speed control mode, then the off-road speed control system may apply the vehicle brakes and balance their effect with an appropriate level of engine torque whilst additionally demanding support from a hill-hold assist system. Hill-hold assist is an automated braking feature arranged to release the brakes during a hill-start only when there is sufficient torque available from the powertrain to prevent unwanted movement of the vehicle, in other words, to prevent the vehicle moving backwards down the hill.

In some embodiments, the off-road speed control system may be able to control or otherwise influence gear and ratio selection, to ensure that the vehicle is travelling at low speeds off-road in a gear appropriate to avoid engine stalling and maintain suitable progress.

In some embodiments the proposed off-road speed control system may be able to control or otherwise influence operation of the Hill Descent Control (HDC) system automatically to apply the vehicle brakes as the vehicle travels in off-road speed control mode down a steep slope. In this situation, the system will ensure that the vehicle engine is kept running but is not permitted to push the vehicle speed over the desired set-speed.

It is to be understood that in some embodiments a vehicle may be operated in off-road speed control mode in either forward or reverse driving use.

The off-road speed control system may actively look at inputs from traction or stability control systems to determine if the vehicle is still being driven off-road, and manage vehicle speed up to the set speed where traction is limited by one or more slip events, maintaining speed control operation in order to maintain vehicle progress and momentum in slippery conditions rather than cancelling operation. It is to be understood that if speed control were suddenly cancelled automatically in response to a slip event as in the case of conventional speed control systems, for example an event in which a traction control system becomes active, a sudden change in vehicle speed due to speed control cancellation may cause the vehicle to break traction altogether or become stuck.

Figure 8:
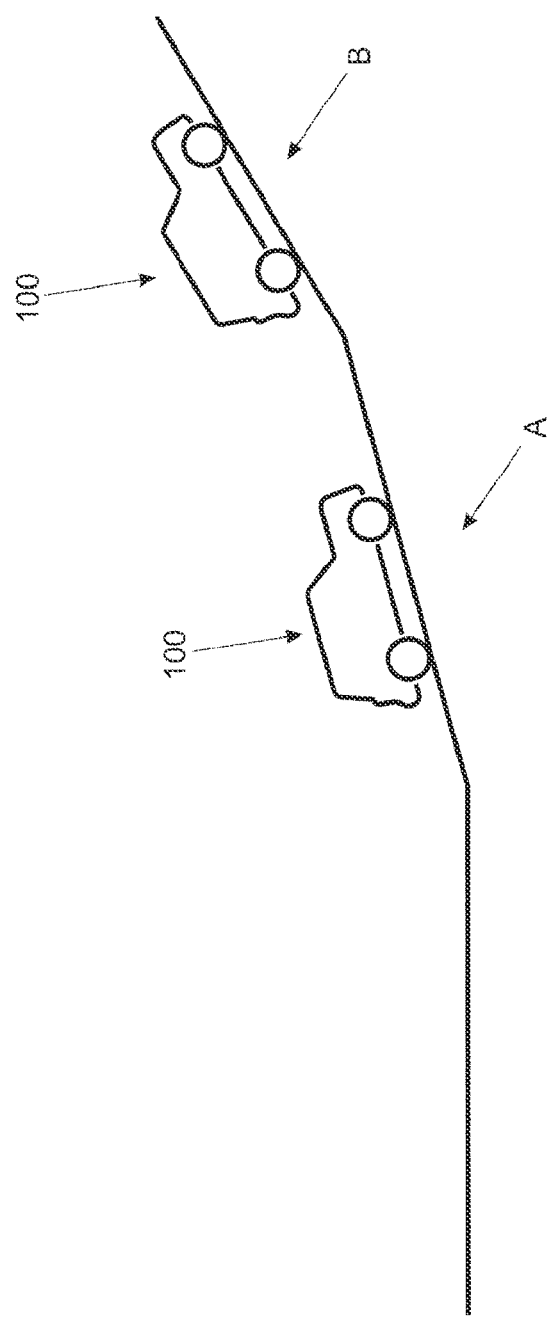
FIG. 8 shows a vehicle according to an embodiment of the present invention ascending a slope at two different locations, each location having a different respective gradient.

FIG. 8 shows a vehicle 100 according to the embodiment of FIG. 1 negotiating a gradient at two different locations, A and B. At location B the gradient experienced by the vehicle 100 is greater than that experienced at location A.

If a user requests a decrease in set speed from a first speed to a second speed at location A, the LSP control system 12 is configured to reduce the amount of torque supplied to wheels of the vehicle 100 by the powertrain 129 at a first rate in order to reduce the speed of the vehicle 100 to match the new set speed. The first rate is lower than that which would be employed if the driving surface were level, for a given surface type. This is because a retarding force due to gravity is acting on the vehicle 100 to accelerate the vehicle downhill, i.e. in opposition to the direction of travel. The LSP control system 12 reduces powertrain torque and optionally applies a braking system in order to seek to maintain vehicle deceleration within the prescribed corridor. The acceleration corridor may, in some embodiments, be in the range +/−(0.1 g to 0.2 g).

As the vehicle 100 progresses it encounters a steeper gradient at location B. If a user requests a similar decrease in set speed from the first speed to the second speed at location B, the LSP control system 12 is configured to reduce the amount of torque supplied to wheels of the vehicle 100 by the powertrain 129 at a second rate that is lower than the first in order to reduce the speed of the vehicle 100 to match the new set speed. A reduced rate of powertrain torque reduction is employed because a retarding force acting on the vehicle 100 to accelerate the vehicle downhill is relatively high compared with that at location A and vehicle speed responds relatively quickly to reductions in powertrain torque. The LSP control system 12 controls powertrain torque (and braking system torque) to allow vehicle deceleration to be maintained within the prescribed corridor of +/−(0.1 g to 0.2 g) in the present embodiment.

Figure 9:
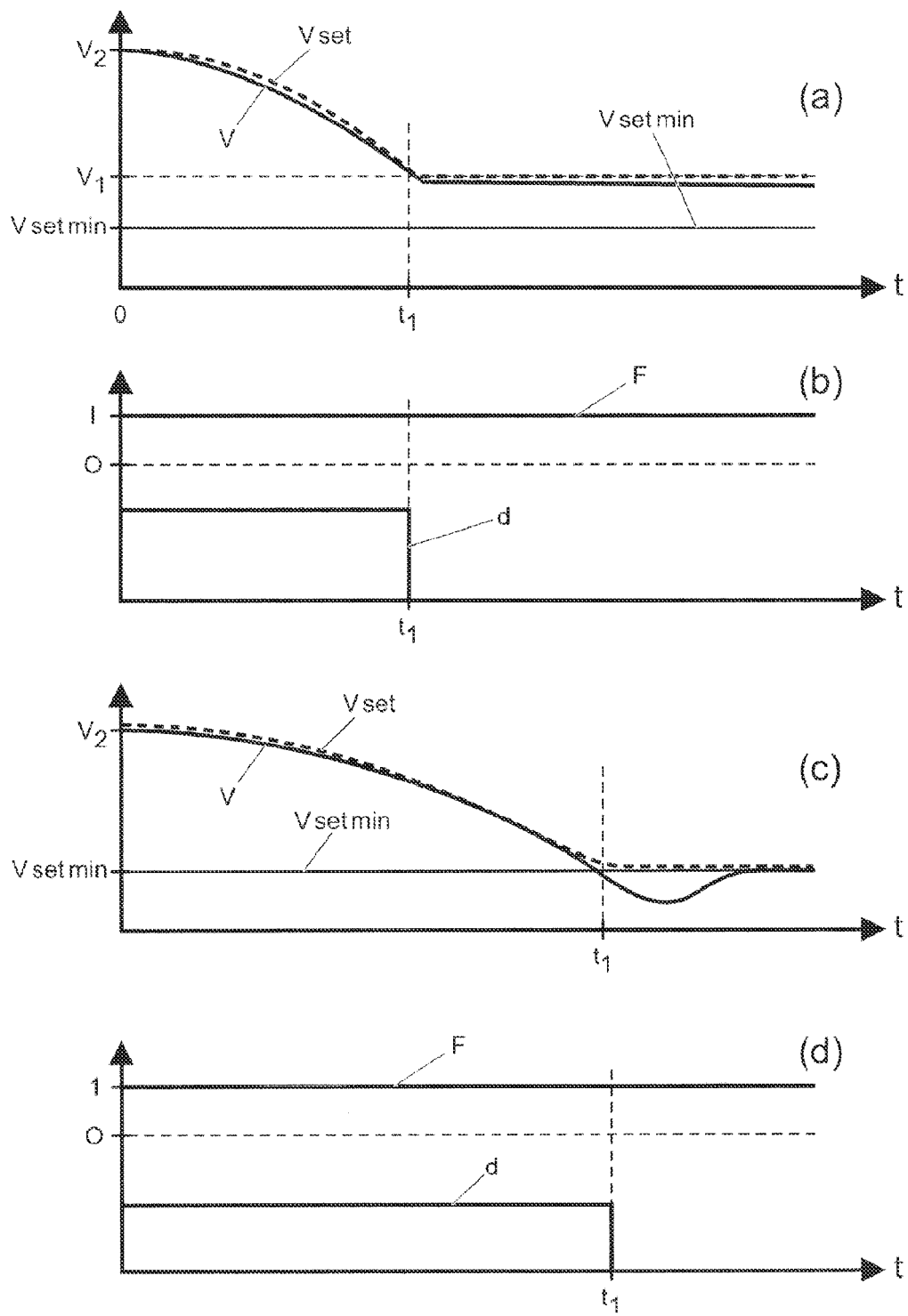
FIG. 9(a)-(f) are plots of certain vehicle parameters as a function of time in different off-road driving situations illustrating operation of a speed control system according to an embodiment of the present invention.
Figure 9:
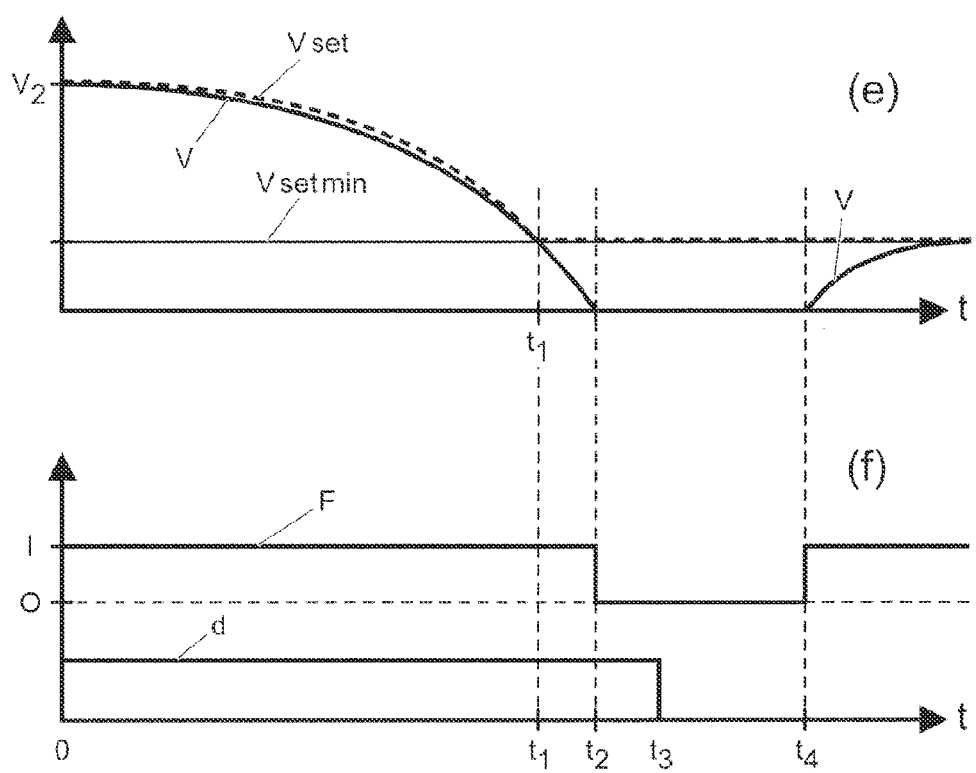

FIGS. 9(a) and 9(b) show schematically values of certain vehicle parameters as a function of time in an example scenario illustrating a manner of operation of the LSP control system 12.

FIG. 9(a) shows a plot of vehicle speed (v) as a function of time whilst the vehicle 100 is ascending a relatively steep gradient, for example when at location B of FIG. 8. At time t=0 the vehicle 100 is travelling at a speed v2. Also at time t=0 the user holds the brake pedal 163 depressed by an amount d (FIG. 9(b)) where d is in the range from d1 to d2 (FIG. 7) such that the vehicle set speed vset reduces over the period from t=0 to t=t1. At time t1 the driver releases the brake pedal 163. In response to the reduction in vset, the LSP control system 12 controls the powertrain torque and, if necessary brake torque, in order to reduce vehicle speed v towards the new set speed vset. Thus, as vset decreases a corresponding decrease in speed v takes place, as shown in FIG. 9(a). The LSP control system 12 controls the powertrain 129 and braking system to achieve a rate of deceleration that is within the prescribed acceleration corridor. In the present embodiment the corridor corresponds to the range +/−(0.1-0.2 g).

The LSP control system 12 remains active throughout this period, with LSP control system status flag F set to F=1 as shown in FIG. 9(b).

FIGS. 9(c) and 9(d) show schematically values of the vehicle parameters represented in FIGS. 9(a) and 9(b) in an alternative example scenario.

FIG. 9(c) shows a plot of vehicle speed (v) as a function of time whilst ascending a similar, relatively steep gradient. At time t=0 the vehicle is travelling at a speed v2. Also at time t=0 the user holds the brake pedal depressed by an amount in the range from d1 to d2 (FIG. 7, FIG. 9(d)) such that the vehicle set speed vset reduces over the period from t=0 to t=t1. At time t1, when set speed reaches a value vsetmin, the driver releases the brake pedal 163. It is to be understood that vsetmin corresponds to the lowest allowable vehicle set speed. In some embodiments the minimum allowable set speed may be a speed of around 1 km/h, 2 km/h, 5 km/h or another suitable value.

In response to the reduction in vset, the LSP control system 12 controls the powertrain torque and if necessary brake torque in order to reduce vehicle speed towards the new set speed vsetmin. The LSP control system 12 controls the powertrain 129 and braking system to achieve a rate of deceleration that is within the prescribed acceleration corridor of +/−(0.1-0.2 g).

In the example illustrated the LSP control system 12 determines that it does not need to apply the braking system in order to reduce vehicle speed v at a rate within the prescribed corridor. However in the example shown, the vehicle speed v falls below the new set speed vsetmin (an undershoot condition), due to the steepness of the gradient. Although the speed falls below vsetmin the control system 12 controls the speed to rise back to vsetmin and the vehicle continues to progress at new set speed vsetmin. As can be seen from FIG. 9(d), the LSP control system status flag F remains set to F=1 throughout the set speed reduction operation. In other words, the LSP control system does not cancel automatically LSP control of vehicle progress even though vehicle speed v falls below vsetmin.

In some scenarios, it is possible that the LSP control system 12 may determine that the rate of fall of speed v is such that the vehicle may eventually have insufficient torque to maintain progress up the slope. If such a determination is made, the system 12 is operable to apply the vehicle foundation braking system to hold the vehicle stationary in order to prevent reversal of direction. That is, brake torque is applied automatically. The LSP control system 12 may then control the powertrain 129 to develop sufficient torque to accelerate the vehicle 100 from rest to new set speed vset.

It is to be understood that the LSP control system 12 may not always be required to hold the vehicle stationary in order to prevent reversal of a direction of travel of the vehicle 100. However, in some embodiments the system 12 may be operable to perform this function.

FIGS. 9(e) and 9(f) show schematically values of the vehicle parameters represented in FIG. 9(a)-(d) in a further alternative example scenario, to further illustrate operation of the LSP control system 12.

The scenario is similar to that shown in FIGS. 9(c) and (d) except that the user releases the brake pedal 163 only after the set speed vset has fallen below the minimum speed vsetmin, such as in this example, when vehicle speed has fallen to zero in the example shown.

FIG. 9(e) is a plot of vehicle speed (v) as a function of time whilst ascending a similar, relatively steep gradient to scenario B of FIG. 8. At time t=0 the vehicle is travelling at a speed v2. Also at time t=0 the user holds the brake pedal depressed by an amount in the range from d1 to d2 (FIG. 7, FIG. 9(f)) corresponding to a relatively light pressure such that the vehicle set speed vset reduces over the period from t=0 to t=t1 from v2 to vsetmin. At time t1, when set speed reaches vsetmin, the driver maintains the light pressure on the brake pedal 163. In the present example, the amount of pressure is sufficient to cause application of the braking system, albeit relatively lightly, such that the braking system is applying brake torque to the wheels. Once the vehicle speed v falls to zero, or a prescribed value below vsetmin, the LSP control system 12 recognises that the user apparently wishes to override control of the vehicle by the system 12 and therefore cancels or suspends vehicle control at time t2. LSP control system status flag F is therefore changed from F=1 to F=0.

At time t3 the user releases the brake pedal 163. If deemed necessary a hill hold assistance system or like may maintain a braking system active so as to prevent movement of the vehicle in a reverse direction if a risk of such exists. At time t4 the user selects operation of the LSP control system 12 by pressing 'resume' button 171. Alternatively, the system 12 may resume control of the vehicle sped when the user lifts their foot off the brake pedal and presses the '+' button. Responsive to depression of this button the LSP control system 12 controls the vehicle 100 to accelerate from rest to the minimum set speed vsetmin, and in other embodiments, the system 12 may permit the user to select a previously used user defined set speed held in a memory. The control system 12 again controls the rate of acceleration such that where possible it falls within the prescribed acceleration corridor.

This feature has the advantage that it may greatly reduce user workload over manual driving and minimise wear and tear on a vehicle by avoiding situations where the vehicle may be left labouring up a gradient without making progress or moving backwards due to insufficient torque being supplied to the wheels by the powertrain 129.

Use of a speed control system at low speeds when driving off-road may offer a user of a vehicle considerable advantages in reduced user workload and enhanced vehicle composure. However, if the user attempts to use a conventional cruise control system to negotiate an off-road obstacle such as a boulder field, then the vehicle speed would likely either be too great (typically cruise control systems have a minimum set speed of around 50 km/h) or the vehicle engine would likely stall during the extremes of torque requirement required to negotiate such an obstacle.

One concern in particular is the vehicle's natural tendency to overrun after cresting a boulder. This is where the obstacle necessitates a large supply of torque to the driven wheels in order to lift the vehicle over the obstacle, followed immediately by light application of the brakes to counter the overrun of the engine after the demand for torque has passed. Such precise control of the vehicle powertrain and brakes is not possible with cruise control systems currently available today.

In one arrangement the system may be operable automatically to apply a retarding torque to one or more wheels of the vehicle in response to a determination that the vehicle is cresting an obstacle thereby to counteract powertrain overrun and maintain substantially the set speed as the vehicle negotiates the obstacle.

The retarding torque may be applied by means of one or more selected from amongst a braking system, an electric machine, a gear shift or any other suitable means.

Vehicle composure may be maintained without excessive variation in speed which may give rise to the vehicle body being perceived by an occupant as lurching as the vehicle negotiates an obstacle.

The determination that the vehicle is cresting an obstacle may be made in response to a signal received by the system indicative of vehicle attitude, for example via a controller area network (CAN) or other suitable data bus, a direct sensor input or any other suitable means. In addition or instead, cresting may be inferred when a drop-off in respect of required torque is detected following a steep rise in requested torque required to maintain progress.

Optionally the system may be operable to apply a retarding torque to one or more wheels when it is detected that the vehicle is negotiating an obstacle as the vehicle climbs at least a portion of the obstacle before cresting is detected. Further the system may be operable to modulate the amount of retarding torque applied in dependence on a determination that the vehicle is cresting thereby to maintain substantially the set speed. This feature has the advantage that in some situations vehicle composure may be further enhanced since the powertrain is working against a damping force applied by the retarding force, reducing fluctuations in vehicle speed as the obstacle is negotiated.

The system may be operable to detect cresting by one or more wheels of the vehicle (for example by reference to one or more of vehicle attitude, changes in vehicle attitude, vehicle suspension articulation (extension or compression) and any other suitable parameter.

It is to be understood that some arrangements provide an off-road speed control system with information about the terrain over which the vehicle is driving, as well as the vehicle's attitude, wheel articulation, wheel speed, gear selection, tyre friction, rolling resistance and TR (terrain response) mode. In some embodiments, if the user is using off-road speed control to travel over an obstacle such as walking-holes, or steps, the off-road speed control system may supply sufficient torque to overcome the obstacle and deploy (say) the vehicle braking system to provide an appropriate restraining force as the system detects that the demand for torque (in order to maintain a set speed) is reducing as the vehicle crests the obstacle. The system deploys the retarding force in order to counteract powertrain overrun, preventing the vehicle from unintentionally exceeding the set-speed and maintaining composure and control.

It is to be understood that a retarding torque applied by (say) a vehicle braking system is typically much more responsive in terms of rate of change of torque applied to wheels of the vehicle compared with a powertrain due to lag in the response of an internal combustion engine (ICE) to changes in accelerator pedal or other accelerator input signal (for example a signal from a speed control system).

That is, due to the physical nature of an ICE, torque output tends to lag torque demand. In particular, where torque demand geos from high to low, the rotational momentum of the engine holds the torque output artificially high until the engine has time to slow down. Unless drive is disconnected from the wheels by a clutch or similar means, the response lag of the engine may manifest itself as a vehicle overrun as the vehicle crests over the obstacle, i.e. vehicle speed increases above that which is desired. This may be perceived as the vehicle lurching over the obstacle, causing the vehicle to travel too quickly towards a successive obstacle and/or causing the rear wheel to come into contact with the obstacle aggressively. These characteristics are overcome or at least mitigated with an off-road speed control system according to an embodiment of the present invention.

The proposed system is intended to actively monitor torque requirements necessary to overcome an obstacle and to manage known control delays by actively employing a mechanical restraining or damping force to the vehicle to mitigate against overrun after cresting, greatly enhancing vehicle composure during off-road driving. As noted above the damping force may be applied by means of a vehicle braking system, electric machine, gear shift or any other suitable means.

As also noted above, the off-road speed control system may be provided with information about a vehicle's attitude as well as one or more of wheel speed, gear selection, tyre friction, rolling resistance, wheel articulation and TR mode. In this way, if the user is using off-road speed control to travel off-road at a slow speed, say 5 km/h, when the vehicle is travelling over an obstacle such as a step or over walking-holes, the off-road speed control system can determine when the vehicle has almost crested the obstacle by rate of change in torque required, and deploy an appropriate retarding torque by means of (say) the braking system in order to overcome engine overrun. In this way, the off-road speed control system may predict that the requested reduction in torque may result in the vehicle lurching forwards due to engine overrun, and take steps to counter engine overrun before it adversely affects vehicle composure.

It is to be understood that an off-road speed control system according to an embodiment of the invention may temporarily bring the vehicle to a standstill (or almost to a standstill) in extreme conditions in order to negotiate terrain such as a boulder field with multiple objects over which the vehicle must crest. In such events, the application of the retarding torque (for example by operation of the braking system) may be in response to a cresting event at any of the road wheels, which could otherwise give rise to an overrun situation.

In some embodiments an off-road speed control system may be operable to control or otherwise influence gear and/or 'high/low' ratio selection, to ensure that the vehicle is travelling at low speeds off-road in a gear appropriate to avoid engine stalling and maintain suitable progress.

In some embodiments an off-road speed control system may be operable to control or otherwise influence vehicle speed to allow time for adjustment of one or more system configurations. For example to allow time for a change in ride height or tyre pressure or any other suitable parameter, to ensure that the vehicle is travelling with a configuration appropriate to the prevailing terrain. Thus in the event a vehicle encounters relatively rough terrain the speed control system may stop the vehicle or reduce speed in order to allow ride height adjustment and/or tyre pressure adjustment. In some embodiments the speed control system may reduce vehicle speed rather than stopping the vehicle in order to reduce a risk that the vehicle loses traction and becomes stuck.

Figure 10:
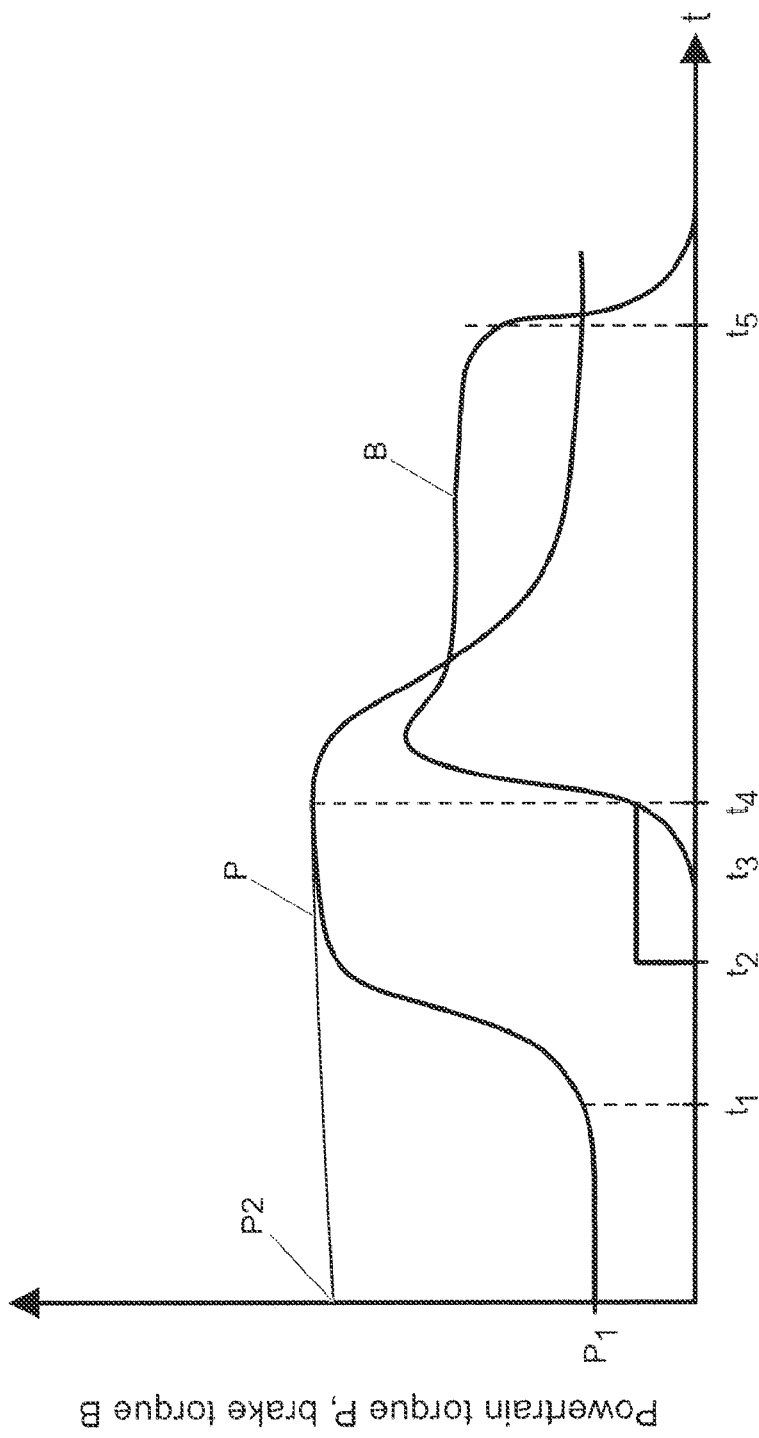
FIG. 10 is a plot of powertrain torque and brake torque as a function of time in a vehicle according to an embodiment of the present invention over the course of a portion of an example off-road journey.

FIG. 10 shows a plot of an amount of torque developed by a powertrain 129 (plot P) and a braking system (plot B) of a vehicle 100 according to an embodiment of the present invention as the vehicle 100 negotiates an obstacle such as a boulder or step.

At time t<t1 the vehicle is moving over relatively flat terrain with the powertrain developing torque P1. At time t=t1 the vehicle 100 encounters the obstacle. The LSP control system 12 detects that the speed of the vehicle falls as a result of the increased resistance to motion presented by the obstacle and automatically demand an increase in the output from the powertrain 129 to maintain the vehicle set speed. In some embodiments the LSP control system 12 reduces temporarily the maximum allowable value of set speed due to detection of the presence of the obstacle. This speed may be less than the driver set speed in some scenarios.

At time t2 the LSP control system 12 determines that the increase in required powertrain torque P is consistent with climbing of an obstacle and triggers priming of the vehicle braking system. This is in order to prepare the braking system for relatively rapid deployment if and when cresting is subsequently detected. At time t3 the LSP control system 12 commands relatively gentle actuation of the braking system in order to provide a small amount of resistance to vehicle motion and reduce an amount of acceleration of the vehicle body if the vehicle subsequently crests over the obstacle and begins to descend the other side thereof. At time t=t4 an increase in vehicle speed consistent with cresting is detected and the LSP control system 12 immediately commands a reduction in the amount of torque P developed by the powertrain 129. The system 12 also commands actuation of the braking system to increase the amount of brake torque B and reduce an amount by which a speed of the vehicle 100 increases due to powertrain response lag following the commanded reduction in powertrain torque P.

Once the vehicle has cleared or negotiated the obstacle, at time t5 the system 12 commands a reduction in the brake torque B to substantially zero and the powertrain torque P settles at a value sufficient to sustain vehicle speed at the prevailing set speed.

It is to be understood that some arrangements may be able to control or otherwise influence operation of the Hill Descent Control (HDC) system described above, to work with HDC, so as to optimise vehicle composure even when negotiating obstacles on a downhill gradient. Embodiments of the invention may also be operable to pre-charge a braking system when a relatively sudden increase in torque is requested. A sudden increase in torque is often followed by a request to decrease powertrain torque and optionally apply braking torque. Relatively rapid provision of brake torque is useful in maintaining vehicle composure, particularly when cresting an obstacle.

Use of speed control at low speeds when driving off-road could potentially offer a user considerable advantages in reduced user workload and enhanced vehicle composure. However, if the user attempts to use a conventional cruise control to negotiate an off-road obstacle such as a step, then the vehicle speed may be too great or the vehicle engine would likely stall during the extremes of torque requirement demanded by such an obstacle. One concern in particular is the natural tendency to overrun by an internal combustion engine (ICE) when torque decreases sharply. The vehicle responds to an increasing/decreasing torque demand control signal differently due to vehicle inertia and the response differences between engine and brakes. In order to improve vehicle composure an improved method of balancing engine torque and brake torque is required if automated control of the two whilst driving off-road is to be feasible.

In some embodiments an off-road speed control system is provided with at least one selected from amongst information in respect of terrain over which the vehicle is driving, vehicle attitude, wheel articulation, wheel speed, gear selection, tyre friction, rolling resistance and TR mode.

In this way, if the user is using off-road speed control to travel over an obstacle such a walking-holes, or steps, the off-road speed control system will supply sufficient torque to overcome the obstacle and apply a different gain or filter value to a rising signal than to a falling signal where the signal is in response to a torque demand from the powertrain and/or means for applying a retarding torque to one or more wheels such as a braking system. This variation in gain compensated for the physical limitations of the system being controlled by the signal, and the off-road speed control system is arranged to balance the control of the means for applying a retarding torque (such as the braking system) with that of the powertrain so as to maintain composure and enhance vehicle performance.

It is to be understood that the means for applying a retarding torque to one or more wheels may be operable to apply the retarding torque directly to one or more wheels, for example via a brake disc of a wheel, or indirectly, for example by applying the retarding torque to a portion of the powertrain. Thus in the case of a hybrid vehicle having an electric machine operable as a generator the off-road speed control system may be operable to apply a retarding torque to the powertrain by means of the electric machine. Other arrangements are also useful.

As noted above an off-road speed control system may be provided with information in respect of one or more of the terrain over which the vehicle is driving, vehicle attitude, wheel articulation, wheel speed, gear selection, tyre friction, rolling resistance and TR mode. In this way, if the user is using off-road speed control to travel off-road at a relatively slow speed, say 5 km/h, when the vehicle is travelling over an obstacle such as a step or over walking-holes, the off-road speed control system can determine when the vehicle has almost crested the obstacle by reference to a rate of change in torque required, and control the braking system (or other means for applying a retarding torque to one or more wheels) to apply an appropriate restraining torque to overcome engine overrun. In this way, an off-road speed control system according to an embodiment of the present invention may determine that a predicted requirement to reduce demanded torque (i.e. when the vehicle crests after climbing an obstacle) may result in the vehicle accelerating forwards at a relatively rapid rate due to engine overrun, and take steps to counter engine overrun before it adversely affects vehicle composure. Thus it is to be understood that the vehicle may interpret a sudden increase in torque demand in order to maintain progress as an indication that there is likely to be a corresponding sudden decrease in torque required. The speed control system therefore applies a braking system so that the powertrain is working against the action of the braking system. Once the vehicle crests, the amount of brake force can be increased to reduce a risk a user perceives body movement as lurching.

In some embodiments the off-road speed control system may intentionally command the powertrain and means for applying a retarding torque to operate together to balance their torque effects on the vehicle and to balance one another, especially as regards any time-lag characteristics associated with the device being operated.

It is envisaged that retarding torque may be applied to one of more wheels to balance demanded engine torque where wheelspin is predicted for said one or more wheels when the engine torque is applied.

It is envisaged that the proposed off-road speed control system may be able to control or otherwise influence gear and ratio selection, to ensure that the vehicle is travelling at low speeds off-road in a gear appropriate to avoid engine stalling and maintain suitable progress.

It is envisaged that the proposed off-road speed control system may be able to work with Hill Descent Control (HDC) described above, so as to optimise vehicle composure even when negotiating obstacles on a downhill gradient. In some embodiments a vehicle may be arranged wherein HDC braking commands may override or otherwise take priority over off-road speed control commands if the gradient on which the vehicle is travelling is greater than a prescribed value.

Embodiments of the present invention are useful in enabling a vehicle to maintain composure when travelling over terrain where the vehicle is subject to relatively high forces acting to induce positive or negative vehicle acceleration, for example when negotiating inclines such as obstacles, hills or the like, or when travelling over terrain offering relatively high drag or rolling resistance. It is to be understood that when a vehicle is travelling up an inclined surface, an amount of torque that must be demanded of an engine to obtain a prescribed acceleration (such as an acceleration in the range from around 0.1 g to 0.2 g parallel to the direction of travel, being a value that a vehicle occupant may comfortably endure for sustained or repeated events) will be greater compared with a situation in which the vehicle is travelling on a level surface or when the vehicle is travelling down an inclined surface. Similarly, if a vehicle is travelling over a level or inclined surface and experiencing relatively high drag or rolling resistance, a greater value of powertrain torque will be required compared with that when driving on a surface offering relatively low drag or rolling resistance.

Vehicle composure can be facilitated when negotiating different terrain described above by changing an amount of gain applied to a rising torque request signal compared with a falling torque request signal in dependence on a value of an external accelerating force applied to the vehicle. It is to be understood that the accelerating force may be positive or negative and embodiments of the invention may accommodate positive or negative values of accelerating force. Vehicle acceleration can be maintained within a prescribed corridor (for example in the range of $+/--(0.1$ g to 0.2 g)) whereby passenger comfort during acceleration or deceleration events may be preserved.

It is to be understood that the accelerating force (positive or negative) may be experienced by the vehicle due to gravity when the vehicle is on an incline. Alternatively or in addition the accelerating force may be experienced due to drag or rolling resistance, acting to cause negative acceleration (i.e. deceleration) of the vehicle when moving over the surface at a given speed.

It is to be understood that where it is determined that an external force is acting against vehicle motion on a surface (for example due to the influence of gravity when ascending an incline or the effects of drag when driving over sandy terrain) the off-road speed control system may be arranged to apply a higher gain to a demand for a positive increase in wheel torque (thereby increasing a rate at which the powertrain delivers an increase in torque to one or more wheels to drive the vehicle) and a lower gain to a demand for negative torque to be applied to the one or more wheels (thereby decreasing a rate at which an increase in retarding force is applied to slow the vehicle). This is because in such a situation an external retarding force is acting to oppose acceleration of the vehicle and thereby oppose torque applied by the powertrain, but is acting in the same sense as brake torque to enhance slowing of the vehicle.

Conversely, where it is determined that an external force is acting to promote vehicle motion on a surface (for example due to the influence of gravity when descending an incline) the off-road speed control system may be arranged to apply a lower gain to a demand for a positive increase in wheel torque (thereby decreasing a rate at which the powertrain delivers an increase in torque to one or more wheels to drive the vehicle) and a higher gain to a demand for negative torque to be applied to the one or more wheels (thereby increasing a rate at which a retarding force applied to slow the vehicle increases). This is because an external force is acting to promote acceleration of the vehicle and thereby acts in the same sense as torque applied by the powertrain, but is acting against brake torque to reduce slowing of the vehicle.

Figure 11:
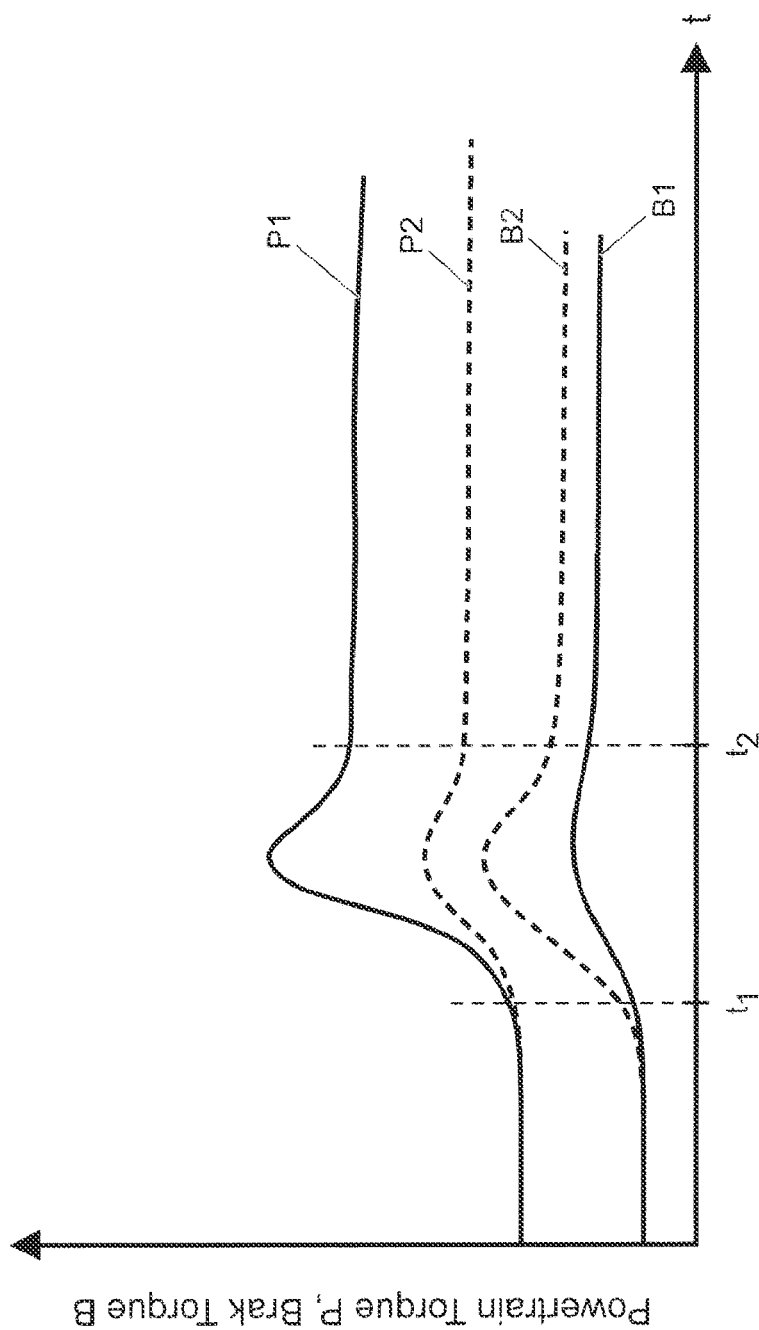
FIG. 11 is a plot of powertrain torque and brake torque as a function of time in a vehicle according to an embodiment of the present invention over the course of respective portions of example off-road journeys.

FIG. 11 shows a plot of powertrain torque P and brake torque B applied by a speed control system according to an embodiment of the invention. An example of such a system is the LSP control system 12 fitted to the vehicle 100 of the embodiment of FIG. 1. The plots correspond to certain different respective scenarios.

In one scenario, at time t=t1 an increase in vehicle speed is demanded by the driver. In the case that the vehicle 100 is ascending a slope, a relatively high gain is applied to the demand to increase powertrain torque compared with that which would be applied when the vehicle is travelling over level ground and in one particular scenario (a given gradient, terrain type, initial and changed set speeds) the powertrain torque is increased by the system 12 according to trace P1. After the vehicle 100 has accelerated to the new (increased) set speed, powertrain torque P is reduced to a value sufficient to sustain the new set speed.

Trace B1 corresponds to brake torque B as a function of time whilst the vehicle 100 is ascending the same slope and a decrease in set speed is commanded. The amount of brake torque B is increased by a relatively small amount compared to movement over level ground since gravitational force is already acting to decelerate the vehicle.

Trace P2 of FIG. 11 shows commanded powertrain torque P as a function of time whilst the vehicle is descending a gradient and an increase in set speed of the LSP control system 12 is required that is of a similar value to that described above in respect of trace P1. It can be seen that a lower gain is applied to the demand for increased powertrain torque to accelerate the vehicle 100. At time t2 the amount of powertrain torque is reduced to a value sufficient to sustain motion at the new set speed. It is to be understood that if the gradient is sufficiently steep, an increase in powertrain torque may not be required. Rather, a decrease in brake torque B may be sufficient to accelerate the vehicle to the new set speed. In this way LSP control system 12 may take advantage of the terrain over which the vehicle is travelling in order respond quickly to the user's demand whilst making progress in a composed manner and with good fuel efficiency.

In comparison, trace B2 corresponds to brake torque as a function of time whilst the vehicle 100 is descending a slope and a reduction in set speed is requested of a similar value to that made in the scenario represented by trace B1 described above. Since gravity is acting to oppose deceleration, a higher gain is applied to the brake request signal in order to reduce the vehicle speed within the prescribed corridor (such that deceleration experienced by the vehicle 100 is in the range from −0.1 g to −0.2 g, in some embodiments).

It is to be understood that other values of acceleration corridor are also useful and reference herein to a corridor of (+/−(0.1 g-0.2 g)) is not to be considered to be limiting. It is to be understood that in some circumstances it may be preferred to have a steeper deceleration corridor than acceleration corridor in order to promote user confidence that the system is responding promptly to their commands.

It is to be understood that by adjusting the gains in the manner described above vehicle behaviour may remain consistent regardless of the terrain over which the vehicle is travelling.

Use of speed control at low speeds when driving off-road offers a user considerable advantages in reduced user workload and enhanced vehicle composure. However, if the user attempts to use speed control to negotiate a steep incline off-road and increases their speed as they travel up the slope, the powertrain controller may attempt to increase engine torque too aggressively resulting in a loss of traction. A slip event occurring during a request for an increase in vehicle speed may cause the suspension of speed-control functionality altogether.

Some embodiments of the present invention provide an off-road speed control system with information about the terrain, over which the vehicle is driving, as well as the vehicle's attitude, wheel articulation, wheel speed, gear selection, tyre friction and TR mode.

In some embodiments, an off-road speed control system is provided that is arranged temporarily to hold vehicle speed or suspend temporarily vehicle acceleration in the event a slip event is detected when the speed control system is responding to a user request to accelerate the vehicle. In some embodiments vehicle speed is held at the speed at which the vehicle first encountered the slip event. In some embodiments the system is configured only to resume vehicle acceleration towards an increased set-speed chosen by the user once the slip event has ceased.

In this way, an off-road vehicle speed control system may accept an increase in set-speed but only attempt to achieve the set-speed where traction permits.

In some embodiments wheel speed is reduced such that wheel slip is limited to a prescribed amount, such as an amount from around 5% to around 20%. Other amounts are also useful. The amount may be responsive to vehicle speed, wheel articulation, vehicle attitude and/or selected TR mode. Other parameters are also useful in addition or instead.

In some embodiments, if slip of one or more wheels still occurs after vehicle speed is reduced, wheel speed is further reduced such that wheel slip falls within the prescribed amount described above.

The system may command a powertrain to deliver a required torque to one or more wheels of the vehicle to maintain a prescribed set speed over ground, in the event slip exceeding a prescribed value is detected when the speed control is accelerating the vehicle to a new set speed, the system being operable automatically to suspend acceleration.

In the event that slip exceeds a prescribed value is detected when the speed control is accelerating the vehicle to a new set speed, the system may be operable automatically to maintain vehicle speed at the speed at which slip exceeding the prescribed value was detected. This action may be taken until vehicle wheel slip is less than a prescribed value, at which point the system may control acceleration to enable the vehicle to achieve the new set speed.

The system may be operable to resume acceleration once the slip event has ceased. Ceasing of the slip event may be determined by reference to a suitable signal such as a flag set by a traction control system (TCS) or stability control system (SCS) when the system is active. Once the TCS or SCS no longer indicates that it is active the off-road speed control system may resume acceleration of the vehicle. In some embodiments the off-road speed control system may resume acceleration at one selected from amongst a prescribed period and a prescribed distance after the detection of excessive wheel slip. Other arrangements are also useful. Signal flags from other subsystems may also be useful.

In some embodiments, in the event it is detected that the vehicle is ascending a step the off-road speed control system may be operable to suspend acceleration and maintain vehicle speed at the same speed as that at which the step was encountered, until the step has been mounted. Acceleration may be limited in some embodiments due to detection of a wading event to manage a bow wave and enhance vehicle control.

In some embodiments, an off-road speed control system may deal with slip events (or steps) detected at one or more following wheels of a vehicle (rear wheels in the case the vehicle is moving in a forward direction) differently from slip events detected at one or more leading wheels (front wheels in the case the vehicle is moving in the forward direction).

In some embodiments a speed control system may be operable to detect when a vehicle may be traversing or crossing a gradient. In one scenario, if the vehicle is crossing a gradient that rises to the left of the vehicle, one or more uphill wheels such as front and rear left hand wheels may be subject to a lighter vehicle load than front and rear right hand wheels. In the example given, if the left hand wheels are slipping and an inclination or other sensor output indicates that a slope rises to the left of the vehicle, the speed control system may manage vehicle speed to reduce speed temporarily below a prescribed value, which may be lower than the user's set speed (depending on the value of user set speed).

In some embodiments, an off-road speed control system may be operable to predict that a slip event (and/or encountering of a step in some embodiments) is likely at one or more trailing wheels based on identification of a slip event (or presence of a step) at one or more leading wheels at a time proportional to vehicle speed and wheelbase of the vehicle. The speed control system may be operable to manage slip or the mounting of a step at the one or more following wheels in such a manner as to reduce the effect on vehicle acceleration of any slip at the following wheels. It is to be understood that if both front and rear tyres on the same side pass over a particular patch of slippery surface and experience slip, vehicle acceleration may be compromised. Vehicle acceleration in response to a user request may be compromised until grip is restored.

Embodiments of the invention have the advantage that an effect of wheel slip on vehicle acceleration when the speed control system is seeking to accelerate the vehicle may be reduced. In some embodiments vehicle composure may be improved substantially. This is at least in part because an amount of slip of one or more leading (and in some embodiments following) wheels may be reduced by suspending acceleration when slip of one or more leading wheels is detected. Furthermore, in some embodiments an amount of damage suffered by an off-road surface due to one or more slip events may be reduced.

In some embodiments the off-road speed control system may be operable to control or otherwise influence gear and/or ratio selection, to ensure that the vehicle is travelling at low speeds off-road in a gear appropriate to avoid engine stalling and maintain suitable progress.

In some embodiments the off-road speed control system may be operable to work with Hill Descent Control (HDC)/ Hill Hold Assist, so as to optimise vehicle composure even when negotiating obstacles on steep gradients. HDC/Hill Hold Assist braking commands are likely to override or otherwise take priority over commands by the off-road speed control system if the gradient on which the vehicle is travelling is greater than a pre-determined value and/or the speed is below a pre-determined threshold.

In some embodiments, the rate of acceleration employed by the speed control system when accelerating from a current cruising speed to a changed set-speed may be influenced by pre-set performance characteristics dictated by Terrain Response in dependence on Terrain Mode.

It is to be understood that in some embodiments a vehicle may be operated in off-road speed control mode in either forward or reverse driving directions.

Figure 12:
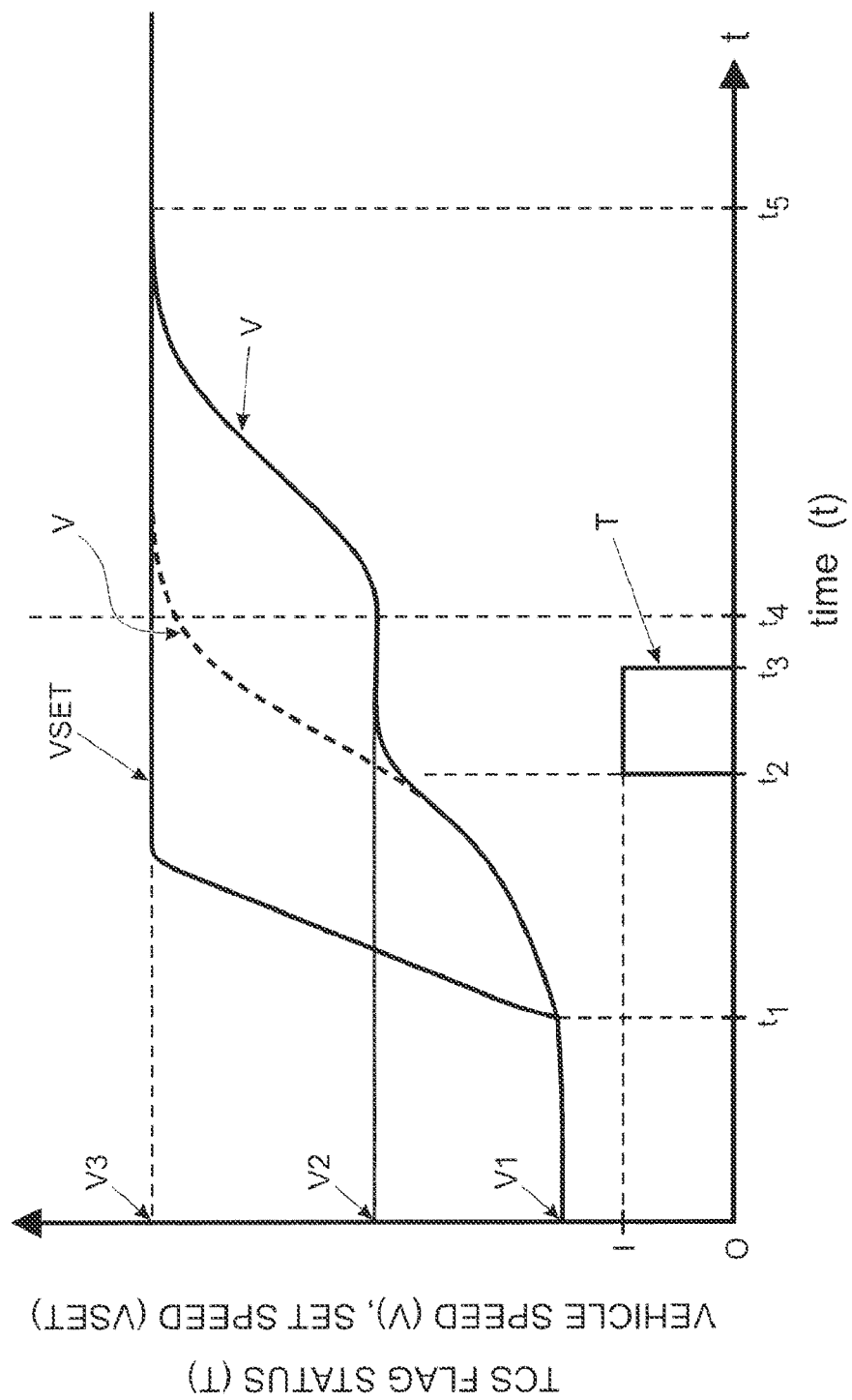
FIG. 12 is a plot of vehicle speed v, set speed vset and traction control system flag status as a function of time in a vehicle according to an embodiment of the present invention over the course of a portion of an example off-road journey.

FIG. 12 is a plot of vehicle speed v, vehicle set speed vset and traction control system (TCS) flag status T as a function of time whilst a vehicle 100 according to an embodiment of the present invention is traversing varied terrain.

At time t=0 the vehicle 100 is travelling at speed v1 under the control of LSP control system 12 with set speed vset=v1. At time t1 a user of the vehicle 100 increases the value of vset to a value vset=v3. The LSP control system 12 responds by controlling the vehicle 100 to accelerate from speed v1 to v3.

In the example shown, at time t=t2 the vehicle 100 experiences a traction control event in which a TCS system intervenes in vehicle progress control to manage excessive slip of one or more wheels 111-115. The TCS system flag T is changed from a value T=0 to T=1 when intervention by the TCS system is triggered. The LSP control system 12 responds to the change in TCS flag status from T=0 to T=1 by suspending further acceleration of the vehicle 100. The system 12 holds the vehicle speed at the speed (v2) at which the vehicle was moving immediately prior to the event that triggered the TCS system to intervene. If excessive slip is still present the LSP control system 12 may reduce wheel speed below the speed at which the vehicle was moving immediately prior to the event that triggered operation of the TCS system, i.e. below v2. The TCS system may be triggered whilst the vehicle is accelerating for a number of different reasons, for example due to slippery level terrain or slippery inclined terrain.

In some embodiments the system 12 holds vehicle speed at v=v2 until the TCS flag status reverts to T=0. The system 12 may then attempt to increase vehicle speed towards the new set speed, v3. In some embodiments the system 12 may wait a prescribed period of time after T is set to zero (this period may be a predetermined period in some embodiments or a period that is chosen responsive to one or more parameters such as vehicle speed, the period for which the TCS flag was set to T=1 and/or one or more other parameters in addition or instead. In the present embodiment the system 12 waits for a prescribed period of time (for example 1 s) before attempting to increase vehicle speed again. Thus once the TCS flag is reset to T=0 at time t=t3, the system 12 waits for 1 s before increasing applied wheel torque at time t=t4 to accelerate the vehicle to speed v3. It can be seen that at time t=t5 the vehicle 100 achieves the new set speed vset=v3.

Trace v' of FIG. 12 shows predicted vehicle speed as a function of time t in the case that the TCS flag T has not been set to T=T1 during the period of acceleration from v1 to v3.

In some embodiments the effects of tyre erosion on off-road routes may be reduced, and both tyre wear and fuel consumption improved. Vehicle composure may be enhanced by adapting LSP control system operation to available levels of grip and resisting over-revving of the engine. In addition, LSP control system 12 is not caused to cancel during a traction control or slip event. Cancellation may be a cause of significant distraction and additional workload when driving off-road.

Use of speed control at low speeds when driving off-road could potentially offer a user considerable advantages in reduced user workload and enhanced vehicle composure. However, if the user attempts to use speed control off-road, a powertrain/traction controller may attempt to intervene when a slip event is detected. This intervention may have twice the effect if the slip event is first detected at a leading wheel and subsequently at a rear wheel following it. This intervention may cause the suspension of speed control functionality altogether.

An off-road speed control system according to an embodiment is arranged to detect patterns in the occurrence of slip events and/or step encounter events and to monitor vehicle speed and optionally steerable road wheel angle and/or steering wheel angle. The system may be operable to predict where a slip event or step encounter event that is detected by a leading wheel is subsequently detected as a slip or step encounter event at a trailing wheel following the path of the leading wheel.

As described previously, an off road speed control system according to an embodiment of the present invention may be operable to accelerate a vehicle to a new set speed if the set speed is increased whilst the vehicle is progressing over terrain. If whilst the vehicle is accelerating slip of one or more wheels is detected or optionally an encounter with a step is detected, the speed control system may be operable temporarily to limit a further increase in vehicle speed. Where a slip event or step encounter event is detected at a leading wheel (such as a front wheel if the vehicle is travelling in a forward direction), the controller may be operable not to take identical action or action for the same duration if a subsequent slip or step encounter event is detected at a following wheel and it is determined to be in response to the following wheel passing over similar terrain to that which had already caused the leading wheel to slip. To this end, in some embodiments the system delay in resuming acceleration following detection of a slip event at a leading wheel may be based on a time proportional to vehicle speed and wheel base after leading wheel slip has fallen below a prescribed threshold. The prescribed threshold may be in the range from around 5% to around 20%. Other arrangements are also useful.

In some embodiments, an off-road speed control system may be arranged to temporarily hold vehicle speed or suspend vehicle acceleration in the event a slip, step (or kerb) encounter event is detected. Vehicle speed may be held substantially at the level at which the vehicle first encountered the slip event or step encounter event, or reduced if the leading wheels continue to slip above a defined threshold. It will be appreciated that the system may be operable to hold speed or suspend acceleration regardless of user request whilst the speed control system is active. However it is to be understood that in some embodiments a user may override the speed control system and force an increase in powertrain torque for example by cancelling speed control system operation or user actuation of an accelerator or brake control by a sufficient amount.

In some embodiments, acceleration is only resumed towards the increased set-speed chosen by the user once the slip event has ceased or the step (or kerb) has been mounted. In this way, the speed control system will accept an increase in set-speed when active off-road, but only attempt to achieve the set-speed where traction permits.

In some embodiments of the off-road speed control system, a slip event (or an encounter with a step) detected first by one or more leading wheels followed by a corresponding one or more trailing wheels may be dealt with differently relative to a situation in which where a slip event or step encounter is detected at one or more leading wheels alone.

In an embodiment the controller predicts the path over terrain that the front and rear tyres will follow and the time delay between a leading tyre passing over a fixed point and a following tyre encountering the same fixed point. Where a slip event or presence of a kerb is detected at one or more rear wheels, and it has been predicted by the controller as being highly likely based on there having been a slip event or kerb encounter at a wheel in front at a time proportional to the vehicle speed and wheelbase of the vehicle, then the system takes action in response to the repeated slip or step encounter event appropriate to one or more prevailing conditions such as the amount of slip or steepness of the step. In vehicles having one or more terrain response modes of operation the off-road speed control system may take into account a selected terrain setting of a terrain response system. It is to be understood that embodiments of the invention are intended to be capable of enabling a vehicle to avoid allowing the same patch of low-mu (i.e. low coefficient of friction) driving surface from having double the effect on vehicle acceleration if both leading and following tyres on the same side of the vehicle pass over it. Similarly, in the case of a step, embodiments of the invention are intended to enable a speed control system to accelerate the vehicle to a set speed as quickly and efficiently as possible without reducing vehicle composure and thereby maintain a comfortable ride for vehicle occupants.

In some embodiments the off-road speed control system may be operable to control or otherwise influence gear and/or 'high/low' ratio selection (where applicable), ensuring that when the vehicle is travelling at low speeds off-road a selected gear and/or ratio is appropriate to avoid engine stalling and maintain suitable progress.

It is envisaged that some embodiments of the present invention may be able to work with HDC®/Hill Hold Assist, so as to optimise vehicle composure even when negotiating obstacles on steep gradients. In some embodiments HDC/Hill Hold Assist braking commands are arranged to override or otherwise take priority over an off-road speed control system if the gradient on which the vehicle is travelling is greater than a pre-determined value and/or the speed is below a pre-determined threshold.

It is envisaged that the rate of acceleration from a current speed to a changed set-speed may be influenced by pre-set performance characteristics dictated by Terrain Response in dependence on Terrain Mode.

Embodiments of the present invention may greatly reduce the effects of tyre erosion on off-road routes and improves tyre wear and fuel consumption. Embodiments of the invention may further improve vehicle composure by adapting to available levels of grip and resisting over-revving of the engine.

As described above, it is to be understood that in some embodiments if a slip event occurs or a step is encountered by one or more leading wheels and it is determined that one or more following wheels will pass within a prescribed distance of a path of a leading wheel, the system may control operation of the vehicle in such a manner as to reduce an effect on rate of vehicle progress and/or occupant comfort of the terrain causing the slip or step encounter event. The reduction in the effect on rate of progress and/or occupant comfort may be relative to that which would be experienced by the following wheel if anticipatory action were not taken by the speed control system. In some embodiments, in response to detection of a slip or step encounter event, an off road speed control system may redistribute powertrain torque between one or more vehicle wheels so as to reduce an amount of torque applied to a following wheel when it passes within the prescribed distance of the location at which the leading wheel experienced slip or encountered the step. It is to be understood that in some arrangements the prescribed distance may be sufficiently low (optionally substantially equal to zero) that a path of the following wheel must pass over a path of the leading wheel in order to invoke a torque redistribution response by the off-road speed control system. Redistribution of torque may be performed by means of one or more powertrain clutches, optionally by means of a rear, centre or front differential arrangement.

In some embodiments the off-road speed control system may be configured to reduce the amount of torque applied to the following wheel to a value at which slip of the leading wheel was reduced, and/or to a value below a prescribed value (for example to or below 20%). The reduction may be effected when the following wheel comes within a prescribed distance of the terrain that caused a slip or step encounter at a leading wheel in some embodiments although other arrangements are also useful.

In some embodiments the off-road speed control system may reduce the amount of torque applied to the following wheel substantially to zero. In some embodiments the speed control system may be operable to increase the amount of torque applied to a leading wheel when the following wheel subsequently comes within a prescribed distance of the leading wheel. In some embodiments the change in torque distribution may be made for one selected from amongst a period of time or for a distance traveled corresponding to that for which slip was experienced by a leading wheel. Other arrangements are also useful.

It is to be understood that increasing temporarily an amount of torque applied to a leading wheel may be appropriate in some circumstances where it is important to obtain as much traction as possible. In some front embodiments having a front mounted engine, front wheels of the vehicle may typically carry a greater proportion of vehicle weight than rear wheels, optionally depending on vehicle loading, due to the presence of an engine and transmission at a front of a vehicle. Accordingly greater traction may be available from the front wheels in some circumstances.

In some embodiments, when it is predicted that a following wheel may encounter slip due to detection of such an encounter at a leading wheel, brake intervention may be applied. In some embodiments a brake force may be applied to one or more following wheels, acting against powertrain torque so as to reduce a risk of wheel flare in the event an area of low coefficient of friction is encountered.

In some embodiments, when it is predicted that a following wheel may encounter a step slip due to detection of such an encounter at a leading wheel, brake intervention may be applied. In some embodiments a brake force may be applied to one or more following wheels, acting against powertrain torque so as to reduce a risk that an occupant of the vehicle experiences a variation in speed which may give rise to the vehicle body being perceived by the occupant as lurching when negotiating a step in terrain, for example due to the present of a boulder, rock formation or a step.

Figure 13:
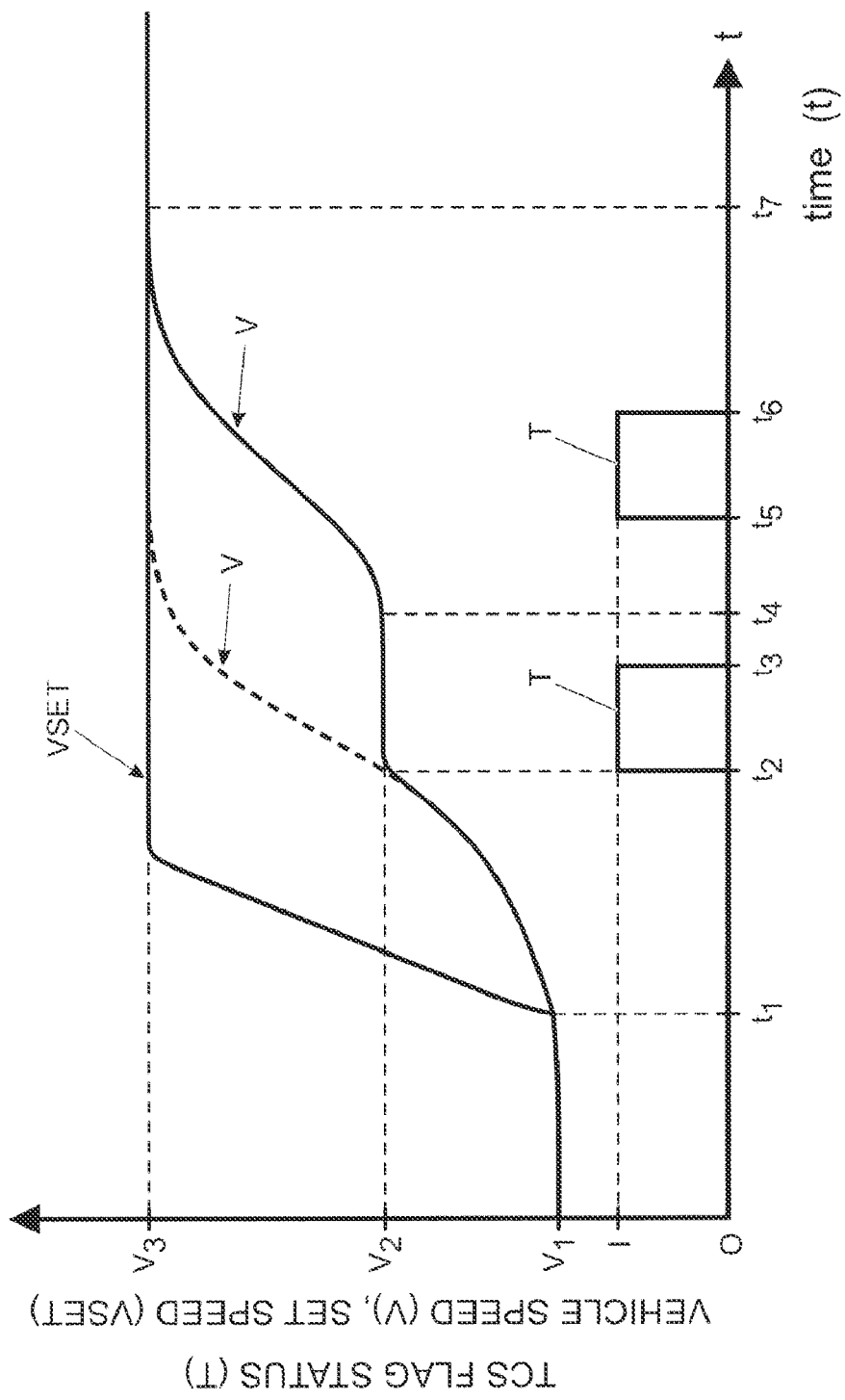
FIG. 13 is a plot of vehicle speed v, set speed vset and traction control system flag status as a function of distance for a vehicle according to an embodiment of the present invention over the course of a portion of a further example off-road journey.

Operation of a vehicle 100 according to an embodiment of the present invention will be described by reference to FIG. 13. The vehicle 100 is operated in a four wheel drive mode in which powertrain torque is be applied to each of the four wheels 111, 112, 114, 115 as the vehicle 100 is driven. FIG. 13 is a plot of vehicle speed v, LSP control system set speed (set by a user) vset and traction control system (TCS) status flag T as a function of time t as the vehicle 100 climbs a hill of a given gradient. The hill has patches of relatively low coefficient of surface friction (such as wet grass, mud or the like). At time t=0 the vehicle is ascending the hill under the control of the LSP control system 12 user set speed vset=v=v1. At time t=t1 the user holds the accelerator pedal 161 of the vehicle 100 depressed by an amount within the range d=d1-d2 (FIG. 7) causing the set speed to increase from vset=v1 to vset=v3. The LSP control system 12 causes the vehicle 100 to accelerate towards speed v=v3, ensuring that the rate of acceleration remains within the prescribed corridor, for example, +0.1 g-0.2 g.

At time t=t2 the TCS flag is set to T=1 as leading wheels of the vehicle 100 encounter an area of relatively low coefficient of friction and suffer excessive slip. The LSP control system 12 responds by suspending further acceleration and seeks to hold vehicle speed at v=v2. Vehicle wheel speeds are therefore reduced to or maintained at values corresponding to the vehicle speed immediately prior to the occurrence of slip. In some embodiments, in addition a brake system may be applied to the one or more wheels that have suffered slip, acting against powertrain torque, in order to reduce a risk of flare by providing a retarding force against which the powertrain may act.

At time t=t3 the TCS flag is set to T=0 indicating that excessive wheel slip is no longer occurring. The LSP control system 12 now resumes its response to the user defined set-speed request and seeks to accelerate the vehicle 100 to the achieve user set speed v=v3.

The LSP control system 12 calculates a path of the following wheels with respect to the leading wheels of the vehicle 100 as the vehicle continues from the location at which the TCS flag was set to T=1. If the system 12 determines that one or more following wheels are likely to pass within a first prescribed distance of the location at which motion of one or more leading wheels resulted in the TCS flag being set to T=1, the system 12 calculates a path of one or more following wheels over ground. This determination is made in light of a position of steerable road wheels 111, 112 of the vehicle 100 and/or an angular position of a steering wheel 171.

If one or more following wheels do come within the first prescribed distance of the location at which motion of one or more leading wheels resulted in the TCS flag being set to T=1, the LSP control system 12 is configured to apply a braking torque to said one or more following wheels acting against powertrain torque applied to said one or more wheels, and/or momentarily shift drive torque away from said one or more wheels to another wheel that is determined to have a lower risk of experiencing excessive slip. This reduces a risk of flare of the following wheels if they encounter a similar driving surface to the leading wheels, having a relatively low surface coefficient of friction. In some embodiments, in addition the LSP control system 12 increases the amount of torque applied to the leading wheels of the vehicle 100 when braking torque is applied to the following wheels in order to compensate for a reduction in net torque applied to the following wheels.

In some embodiments, the system 12 does not calculate a path of the following wheels relative to that of the leading wheels, but applies the braking torque or shifts powertrain torque between wheels when the following wheels have traveled a distance corresponding to the length of a wheel base of the vehicle 100 from the position at which TCS flag T was set to T=1. The distance may be slightly less than the length of the wheel base in some embodiments. It is to be understood that this may allow time for the drivetrain to react and that that action has a useful and stabilising effect on vehicle composure.

The first prescribed distance may be around 1 m in some embodiments although other values are also useful.

In some embodiments, in addition to or instead of applying braking torque to the following wheels, the LSP control system 12 may redistribute powertrain torque between the following wheels and the leading wheels such that the amount of torque applied to one or more following wheels is reduced and the amount applied to one or more leading wheels is increased. This has the advantage that when the following wheels pass over the area of reduced surface coefficient of friction a risk that the following wheels suffer excessive slip, triggering intervention by the TCS system, is reduced. That is, the LSP control system 12 may increase the amount of torque applied to leading wheels to compensate for a reduction in net torque applied to the following wheels. It is to be understood that this action may be helpful in reducing an effect of the region of driving surface of reduced surface coefficient of friction on the rate of progress of the vehicle across terrain.

It is to be understood that in some embodiments the LSP control system 12 may calculate a path of a left hand following wheel with respect to the path of a left hand leading wheel, and the path of a right hand following wheel with respect to the path of a right hand leading wheel independently of one another. Alternatively, the system may calculate the path for each wheel in relation to a single, leading wheel dependent on the direction of vehicle travel.

In an embodiment the speed control system may be operable to apportion more torque to one or more wheels on a harder packed, higher grip surface in order to manage slip and improve vehicle composure.

In one example of vehicle operation, the vehicle may move from a hard-packed surface to a relatively softer surface and then back to a hard-packed surface. As the vehicle moves onto the soft surface, the system may be arranged to apportion more torque to one or more following wheels so as to push the vehicle onto the soft surface. When subsequently exiting the soft surface, the system may be operable to apportion greater torque to the leading wheels, so as to pull the vehicle onto the hard packed surface. The system monitors a response of the vehicle body to one or more external forces and to apportion torque between wheels so as to enhance vehicle composure.

In some embodiments, a speed control system may alternatively increase an amount of torque applied to one or more wheels experiencing relatively high drag in order to compensate for the relatively high drag.

In some embodiments the speed control system may be operable to determine whether to increase torque to wheels experiencing higher drag or lower drag in dependence on a determination as to which option would deliver optimum vehicle composure.

Embodiments of the present invention have the advantage that an amount of slip of one or more following wheels may be reduced relative to one or more leading wheels by anticipating slip of the one or more following wheels when they encounter areas of a surface that are known to be of reduced surface coefficient of friction, based on previously detected slip events in respect of the one or more leading wheels.

Use of a speed control system at low speeds when driving off-road may offer a user considerable advantages in reduced user workload and enhanced vehicle composure. However, if a user attempts to use a speed control system off-road, a powertrain controller, in an attempt to provide a sufficient amount of torque to overcome a high drag obstacle, may cause the amount of torque delivered to one or more wheels to overshoot an amount required to maintain the prevailing set speed and maintain vehicle composure when the level of drag reduces. This may cause an occupant of the vehicle to experience a variation in speed which may give rise to the vehicle body being perceived by the occupant as lurching. An example of this is where a vehicle is being driven through soft sand towards an asphalt or concrete road. Whilst driving through the sand, a relatively large amount of torque is needed to overcome the drag of the sand on the vehicle and to maintain the desired set-speed. When the vehicle tyres contact the road, the amount of drag reduces greatly. However, the powertrain may be unable to effect a reduction in the amount of torque applied to one or more wheels sufficiently quickly to compensate for the change in terrain. This is due to the rotational momentum of the engine. The result is that as the tyres grip the road, the powertrain is momentarily producing more torque than is required to negotiate the new surface, causing the vehicle to momentarily exceed the target speed, adversely affecting passenger comfort. This effect can be difficult to control if the terrain is constantly changing. Powertrain response lag may become particularly apparent to a user in such circumstances.

In some embodiments an off-road speed control system according to the present invention may be provided with information in respect of at least one selected from amongst terrain over which the vehicle is driving, vehicle attitude, wheel articulation, wheel speed, gear selection, tyre friction, rolling resistance and selected terrain response (TR) mode. In vehicles not having one or more terrain response modes such information is not provided.

In some embodiments, an off-road speed control system is arranged to look for patterns or variations in vehicle drag such as those that may be caused by driving through soft sand or deep water, and to monitor vehicle speed to predict where a reduction in one or more parameters such as drag and/or rolling resistance may result in a perceivable speed overshoot. The overshoot may be due to a temporary over supply of torque from the powertrain. The system may be operable to compensate for that oversupply by applying automatically an appropriate restraining torque.

The restraining torque may be provided by application of a braking system to one or more wheels, for example by means of an electric machine (which may for example be part of a regenerative braking system in some embodiments), by changing a powertrain gear ratio, for example by changing a selected gear of a transmission, or by any other suitable means.

It is to be understood that by compensating for the momentary torque overshoot by application of an appropriate opposing torque, vehicle composure may be maintained and speed overshoot can be avoided or at least an amount of overshoot reduced. It is to be understood that in compensating for the momentary variation in torque required to traverse a terrain with varied friction (thus giving rise to variations in wheel drag) the off-road speed control system may apply an appropriate opposing torque (positive or negative). Thus vehicle composure may be maintained and speed overshoot or undershoot may be avoided.

In some embodiments an off-road speed control system may be configured to take into account drag on the vehicle at one or more wheels that are experiencing relatively high drag when the system determines how much opposing torque to apply to the powertrain in order to reduce a risk that an occupant of the vehicle experiences a variation in speed which may give rise to the vehicle body being perceived by the occupant as lurching. It is to be understood that the net amount of opposing torque required may correspond to the amount of excess torque due to the powertrain less the amount of opposing torque on the powertrain due to drag or other retarding force acting on the vehicle, for example rolling resistance of one or more wheels or other drag acting on the vehicle, for example due to wading through water. In some embodiments an effect of gravity on the vehicle due to a gradient may be taken into account.

In the case of a vehicle negotiating sandy terrain, if one or more leading wheels of the vehicle encounter a relatively low drag surface (such as a metalled road), the amount of torque that is required to be applied to the one or more leading wheels in order to reduce excessive acceleration may correspond substantially to the amount of excess torque developed by the powertrain less the amount of opposing torque on the powertrain due to drag of the following wheels in the sandy terrain.

It is to be understood that one or more leading wheels may be considered to act as pathfinders for one or more following wheels. Some embodiments of the invention allow enhanced comfort management when a vehicle is travelling in a forward direction, in particular because in some embodiments one or more rear wheels may carry less weight than one or more front wheels and occupants of a vehicle may be more sensitive to rear wheel activity than front wheel activity.

In some embodiments, an off-road speed control system is provided that is arranged to permit a user to operate the vehicle at low speeds off-road with the off-road speed control regulating the vehicle speed up to the user selected set-speed.

As noted above, in some embodiments an off-road speed control system may be arranged to look for patterns or variations in vehicle drag as may be caused for example by driving through soft sand or deep water. The system may employ data in respect of such patterns or variations in combination with a knowledge of vehicle speed to predict where a reduction in drag is likely to result in a perceivable speed overshoot. Thus it is to be understood that in some embodiments, an off-road speed control system predicts where a momentary oversupply of torque is likely to occur and compensates for that oversupply by applying an appropriate restraining torque to the powertrain, optionally via the brakes. By compensating for the momentary torque overshoot by application of an appropriate opposing torque, vehicle composure may be maintained and speed overshoot can be avoided.

In some embodiments the off-road speed control system may form part of an All-Terrain Progress Control (ATPC) system, which may be arranged to work independently or in conjunction with vehicle control systems arranged to optimise vehicle configurations for a given terrain over which the vehicle is travelling. An example of such a system is Terrain Response®.

In some embodiments an off-road speed control according to an embodiment of the present invention may be arranged to determine when to apply a retarding torque in dependence on factors such as selected TR mode, road roughness, brake temperature, gradient and a determination whether a user has intervened manually in respect of progress control, for example by depressing an accelerator pedal, changing off-road speed control set speed or changing TR mode. Other arrangements are also useful.

In some embodiments, if a user has requested an increase in vehicle speed by the off-road speed control system the system may be arranged to temporarily hold vehicle speed or suspend vehicle acceleration in the event a torque overshoot is predicted, and only to resume vehicle acceleration towards an increased set-speed once the system is confident that it can compensate for unwanted acceleration. In this way, the vehicle may accept an increase in set-speed when the off-road speed control system is active, but only attempt to achieve the set-speed where the terrain over which the vehicle is moving will permit vehicle acceleration within a defined corridor (i.e. within a prescribed range, optionally between around +/−(0.1 g-0.2 g), and not be caused to overshoot due to a detected change in drag.

It is to be understood that in some embodiments, a reliability of a prediction of drag variation may further be enhanced by monitoring by the speed control system of a path that respective leading and following wheels or tyres are taking when a change in drag is detected at a leading wheel. In this way, the controller may make an assumption that if a following tyre is following the path of a leading tyre, the reduction in drag experienced by the leading tyre will be seen by the following tyre at a time proportional to vehicle speed and wheelbase. This method may be employed to shift unwanted torque (that would otherwise cause an occupant to experience vehicle acceleration that may be perceived as lurch) to the tyre in the high drag area during the predicted window of torque overshoot, improving fuel economy and reducing brake wear. Shifting of unwanted torque may be accomplished by means of one or more clutches and/or by means of a differential arrangement (which may include one or more clutches), for example a front, centre and/or rear differential arrangement. Other arrangements are also useful.

In some embodiments an off-road speed control system according to the present invention may be operable to control or otherwise influence gear and 'high/low' ratio selection, to ensure that the vehicle is travelling at low speeds off-road in a selected transmission gear and a selected high/low ratio that is appropriate to avoid engine stalling and maintain suitable progress.

In some embodiments, the off-road speed control system may be operable to work with a hill descent control (HDC)/Hill Hold Assist (HHA) system, so as to optimise vehicle composure even when negotiating obstacles on steep gradients. In some embodiments the vehicle may be configured such that HDC/Hill Hold Assist braking commands override or otherwise take priority over off-road speed control commands. In some embodiments such priority may be arranged to occur if the gradient on which the vehicle is travelling is greater than a pre-determined value and/or the speed is below a pre-determined threshold. Thus in some embodiments a powertrain and/or braking system may respond to HDC or HHA commands in preference to off-road speed control system commands.

In some embodiments the rate of acceleration that is to be employed to accelerate the vehicle from a current set-speed to a changed set-speed may be selected by the off-road speed control system by reference to one or more pre-determined performance characteristics, optionally characteristics dictated by a Terrain Response system in dependence on Terrain Mode. The characteristics may be prioritised as appropriate in dependence on a change or predicted change in terrain mode. In this way, an off-road speed control system may be arranged to work alone or in cooperation with a Terrain Response system, but not interfere with factors which may otherwise cause erroneous determination of the terrain type.

Figure 14:
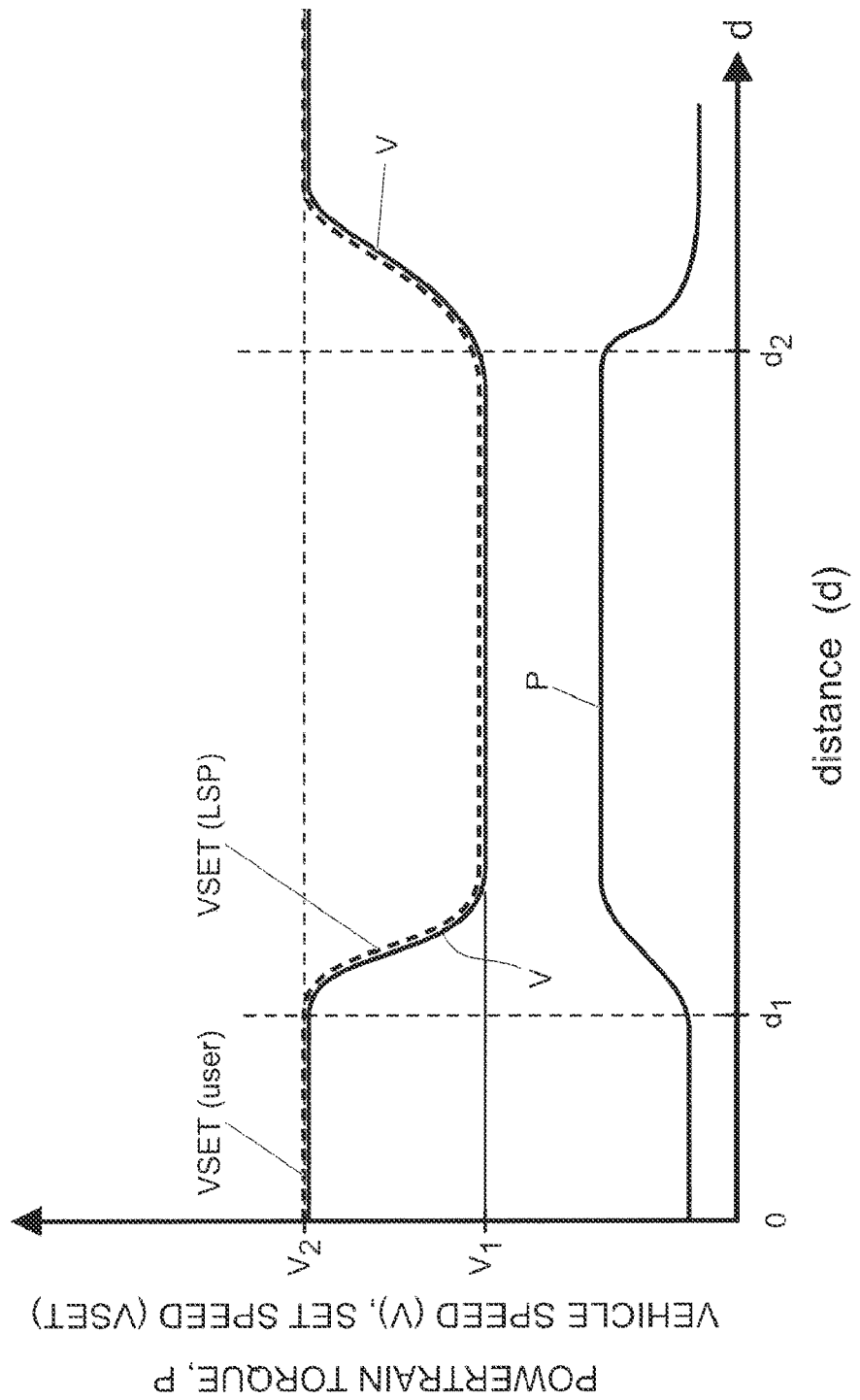
FIG. 14 is a plot of powertrain torque, vehicle speed and set speed as a function of distance in a vehicle according to an embodiment of the present invention over the course of a portion of an example off-road journey.

Embodiments of the invention will now be described by way of example only with reference to the accompanying drawings. FIG. 14 is a plot of vehicle speed v and vehicle set speed vset as a function of distance d from a reference location as a vehicle 100 according to an embodiment of the present invention traverses terrain. It is to be understood that between distances d1 and d2 from the reference location the vehicle 100 encounters sandy terrain, whilst before and after the sandy terrain the vehicle experiences firm terrain having relatively low rolling resistance and a relatively high coefficient of surface friction.

LSP control system 12 controls the vehicle 100 to maintain a user-prescribed set speed vset=v2 over the terrain. When leading wheels of the vehicle 100 first encounter the sandy terrain at distance d1, the LSP control system 12 recognises that a speed v of the vehicle begins to reduce relatively abruptly as shown by trace v of FIG. 14. The control system 12 may also recognise that leading wheels of the vehicle are now experiencing relative high rolling resistance and relatively high drag forces. The LSP control system 12 therefore determines that a reduced set speed vset=v1 is more appropriate to travel over the sandy terrain in order to maintain vehicle composure, and reduces the set speed to this value. The LSP control system 12 therefore controls the vehicle 100 in a manner such as to reduce speed v to this value. Since additional rolling resistance is encountered, the LSP control system 12 may increase the amount of torque P developed by the powertrain 129 as required (as shown in the lower trace P of FIG. 14) in order to maintain new set speed v1.

When the following wheels subsequently encounter the sandy terrain the amount of torque delivered to the following wheels is increased in a corresponding manner to compensate for the increased drag experienced by the following wheels.

As the vehicle 10 continues through the sandy terrain the leading wheels eventually encounter firmer terrain having reduced rolling resistance and a greater surface coefficient of friction, at distance d2. As the leading wheels contact this terrain, a rate of acceleration of the vehicle 100 increases relatively abruptly as the wheels grip the new terrain. The LSP control system 12 detects the increase in acceleration and may determine that a reduction in powertrain torque to the leading wheels is required in order to maintain vehicle composure. The LSP control system 12 therefore commands a reduction in powertrain torque to the leading wheels.

In some embodiments, the LSP control system 12 may also apply a brake torque to the leading wheels at this time, acting to resist wheel rotation against the positive torque applied by the powertrain 129 in order to prevent flare of the leading wheels and/or a likelihood that the set speed vset is exceeded. This feature has the advantage that a lag in powertrain response to the request for a powertrain torque reduction may be accommodated by the LSP control system 12, enabling the system to control the vehicle 100 with increased composure. In some embodiments the LSP control system 12 controls the vehicle 100 in such a manner as to reduce an amount of time for which a rate of acceleration exceeds the prescribed acceleration corridor.

In some embodiments the control system 12 may reduce the amount of powertrain torque provided to the following wheels before the following wheels exit the sandy terrain in order to reduce a flare and/or a likelihood that the vehicle set speed vset is exceeded when the following wheels also leave the sandy terrain. In some embodiments a braking system may be applied to the following wheels in addition or instead. The braking system may be applied to the following wheels once the leading wheels have encountered the new terrain, just before the following wheels encounter the new terrain or as the following wheels encounter the new terrain. Other arrangements are also useful.

Once the vehicle exits the sandy terrain the LSP control system 12 determines that the set speed may now be restored to a value vset=v2. Accordingly the LSP control system 12 increases vehicle speed back to v=vset=v2 after travelling distance d2.

In some embodiments, the LSP control system 12 may be operable to predict when the following wheels will leave the sandy terrain (responsive to vehicle speed and/or distance traveled since the leading wheels encountered the new terrain, and vehicle wheelbase) and reduce an amount of torque applied to the following wheels at or just before the moment at which the following wheels leave the sandy terrain.

In an embodiment the speed control system may be operable to apportion more torque to one or more wheels on a harder, higher grip surface in order to manage slip and improve vehicle composure.

In another example of vehicle operation, the vehicle may move from a hard-packed surface to a soft surface and then back to a hard-packed surface as described above. As the vehicle moves onto the soft surface, the system may be arranged to apportion more torque to one or more following wheels so as to push the vehicle onto the soft surface. When subsequently exiting the soft surface the system may be operable to apportion greater torque to the leading wheels so as to pull the vehicle onto the hard packed surface. The system monitors a response of the vehicle body to one or more external forces and apportions torque between wheels so as to enhance vehicle composure.

In some embodiments, a speed control system may alternatively increase an amount of torque applied to one or more wheels experiencing relatively high drag in order to compensate for the relatively high drag as described above.

In some embodiments the speed control system may be operable to determine whether to increase torque to wheels experiencing higher drag (to compensate for the increased drag/rolling resistance or to wheels experiencing lower drag to push or pull the vehicle in dependence on a determination as to which option would deliver optimum vehicle composure. In some embodiments, if one method is selected and is found to be inadequate, the other method may be attempted. Other arrangements are also useful.

Some embodiments of the present invention have the advantage that an amount of slip of one or more following wheels may be reduced relative to one or more leading wheels by anticipating slip of the one or more following wheels when they encounter areas of a surface that are known to be of reduced surface coefficient of friction, based on previously detected slip events in respect of the one or more leading wheels.

It is to be understood that a change in drag that may be addressed by the system by an increase in torque may be an appropriate indicator that a braking system should be precharged in order to allow the speed control system more quickly to compensate for an over-supply of torque if subsequently required, for example following for example cresting of an obstacle.

Some embodiments have the advantage that they may reduce greatly the effects of tyre erosion on off-road routes and improve tyre wear and fuel consumption. Embodiments of the invention may further improve vehicle composure by adapting to rapid or abrupt changes in drag or other forces acting on a vehicle caused by variation in terrain and resisting speed overshoot by a vehicle under the control of the off-road speed control system.

Use of a speed control system at low speeds when driving off-road may offer a user considerable advantages in reduced user workload and enhanced vehicle composure. However, speed control systems often have an operational limit applied in respect of the amount of powertrain torque that they are permitted to apply. This is typically a fixed proportion of the maximum torque capacity of the powertrain. This limit is imposed to comply with specific regulations concerning the use of speed control systems on the road and the rate of acceleration that the speed control systems may command during operation on the road. However, this artificially imposed torque limit or ceiling may limit off-road capability.

In some embodiments there is provided an off-road speed control system that is optionally provided with at least one selected from amongst information in respect of terrain over which the vehicle is driving, data in respect of at least one selected from amongst the vehicle's attitude, wheel articulation, wheel speed, gear selection, tyre friction, tyre drag, rolling resistance and selected TR mode.

In some embodiments the system is arranged to take information relating to one or more settings of one or more vehicle systems or sub-systems and optionally data in respect of vehicle performance and to determine if the vehicle is being driven off-road. Once the off-road speed control system is in operation and it confirms that the vehicle is being driven off-road, then a prescribed powertrain torque limit may be applied until the system determines that more torque (exceeding the prescribed limit) is required. The system may determine that more torque is required for example by reference to vehicle response to torque demand.

It is to be understood that torque greater than the torque limit may be required in some circumstances in order for the vehicle to negotiate an obstacle such as a rock, a steep incline or other terrain or complete a wading operation. The prescribed torque limit under normal off-road speed control conditions may for example correspond to that imposed in respect of on-highway speed control operation, or any other suitable value.

Once the off-road speed control system has determined that a torque increase is required, the system may then determine if it is appropriate temporarily to increase the available torque limit in order to overcome or otherwise negotiate the obstacle, slope or other terrain.

As noted above, in some embodiments, a 'normal' torque limit is applied to the amount of torque a powertrain may develop until the system determines (e.g.) from vehicle response to torque demand) that more torque (exceeding the torque limit) is required in order to maintain adequate progress. The system then determines if it is appropriate temporarily to increase the available torque limit in order to overcome or otherwise negotiate the obstacle.

In some embodiments the off-road speed control system may be configured to perform at least one of the following checks before allowing an increase in powertrain torque above the prescribed limit:

(a) confirm that vehicle speed <target set-speed (the lower of a user set speed and any maximum set-speed imposed by the speed control system);
(b) confirm that powertrain torque is at a first limit;
(c) Confirm that off-road speed control has been active with the powertrain torque output at a prescribed first powertrain torque limit for a period exceeding a pre-determined time period or for a prescribed number of engine revolutions;
(d) confirm that a brake control such as a brake pedal is not being actuated by a user, e.g. depressed in the case of a brake pedal;
(e) confirm that no other intervention by a user is present (in some embodiments an example of such an intervention is user actuation of an accelerator control, a request for a decrease in speed control system set speed either via a '−' button in some embodiments and/or a brake pedal in some embodiments. In addition or instead the system may also check that a speed control 'cancel' button is not being pressed. In some embodiments in addition or instead the system may check that a speed control activation button has not been pressed whilst the speed control system is in operation (since this may be an indication that the user wishes to cancel speed control system operation). In some embodiments in addition or instead the system may check that a hill descent control (HDC) or like function limiting vehicle movement is not active. It is to be understood that the system may be configured not to take action that would work against operation of a HDC or like system);
(f) confirm that steering angle is below a pre-determined threshold;
(g) check whether vehicle attitude indicates the vehicle is travelling down a gradient; if so, the system may calculate whether brake torque application would be sufficient to compensate for powertrain overrun and still maintain vehicle composure if grip to one or more wheels is subsequently restored to a nominal value and/or drag experienced by one or more wheels is subsequently reduced to a nominal value. The system may make this determination on the basis that the gradient currently experienced by the vehicle is retained when grip is restored or drag relieved. If the system determines that sufficient negative torque cannot be applied to maintain vehicle composure in such circumstances, the system may deny an increase in powertrain torque limit whilst travelling downhill. By composure is meant that the system does not allow vehicle speed to accelerate up to the set speed at a rate higher than a value falling within the acceleration corridor (e.g. 0.2 g) and does not allow vehicle speed to increase above the user set speed, i.e. to overshoot vehicle set speed; and
(h) brake system is functioning correctly and has been primed.

In some embodiments, the off-road speed control system may be operable to check the selected TR mode if the vehicle is equipped with a TR system. Increase of the powertrain torque limit may be subject to a determination that the vehicle is in one of a prescribed set of one or more TR modes (or not in a prescribed set of one or more TR modes). For example if the selected TR mode corresponds to driving on a relatively slippery surface (such as a 'snow/ice' mode), an increase in powertrain torque limit may be prohibited in some embodiments. Other arrangements are also useful.

In some arrangements, an increase in powertrain torque limit may be permitted but a limit placed on an allowed rate of increase of powertrain torque. Thus in some embodiments if it is determined that the vehicle is operating on a slippery surface, but that an increase in powertrain torque is desirable, the increase may be permitted subject to a limitation in respect of the rate of increase of powertrain torque and/or the new maximum allowed value of powertrain torque.

In some embodiments, in the event it is detected that the vehicle is wading, the off-road speed control system may be operable to increase the powertrain torque limit in order to increase an amount of exhaust gas passing through an engine aftertreatment system and reduce a risk that liquid in which the vehicle is wading enters the aftertreatment system and causes damage. It is to be understood that a catalytic converter and/or particulate filter associated with the aftertreatment system may be particularly vulnerable to damage due to exposure to water when wading.

In some embodiments the off-road speed control system may interact with other vehicle systems temporarily to suspend or change one or more operating parameters to reduce parasitic losses so as to make more torque available to the wheels.

In some embodiments the off-road speed control system may generate notification to the user that more torque is required in order to enable the user to make an informed choice whether to change route, manually intervene, or permit the system to manage negotiation of the obstacle itself. It is to be understood that in some embodiments where the speed control system may not permit an increase in powertrain torque limit, cancellation of off-road speed control functionality may allow the user to request powertrain torque above the prescribed powertrain torque limit associated with speed control system operation.

It is to be understood that an off-road speed control system according to an embodiment of the present invention may form part of an ATPC (All-Terrain Progress Control) system, which may be arranged to work independently of or in conjunction with vehicle control systems arranged to optimise vehicle configurations for a given terrain over which the vehicle is travelling. An example of such a system is Terrain Response™ as described above.

In some embodiments the off-road speed control system may be operable to control or otherwise influence gear selection such as transmission gear and/or 'high/low' ratio selection where such functionality is available.

It is to be understood that the value of raised powertrain torque limit may be reduced in dependence on a determination by the off-road speed control system that the rate of vehicle acceleration has exceeded a prescribed threshold value. This feature may be advantageous in enhancing vehicle composure. Measurement of vehicle acceleration may act as a means of determining vehicle movement independently from one or more wheel speed sensors. Measurement of acceleration may be useful where wheel speed sensor readings appear to conflict, optionally when no two wheel speed readings match each other.

In some embodiments the amount by which the torque limit is raised may be influenced by a pre-set performance characteristic dictated by a Terrain Response (TR) system, optionally in dependence on a selected Terrain Mode and may further optionally be prioritised as appropriate in dependence on a change or predicted change in terrain mode. In this way, the off-road speed control system may be arranged to work alone or in cooperation with the TR system, but not to interfere with factors which may otherwise cause erroneous determination of the terrain type.

Figure 15:
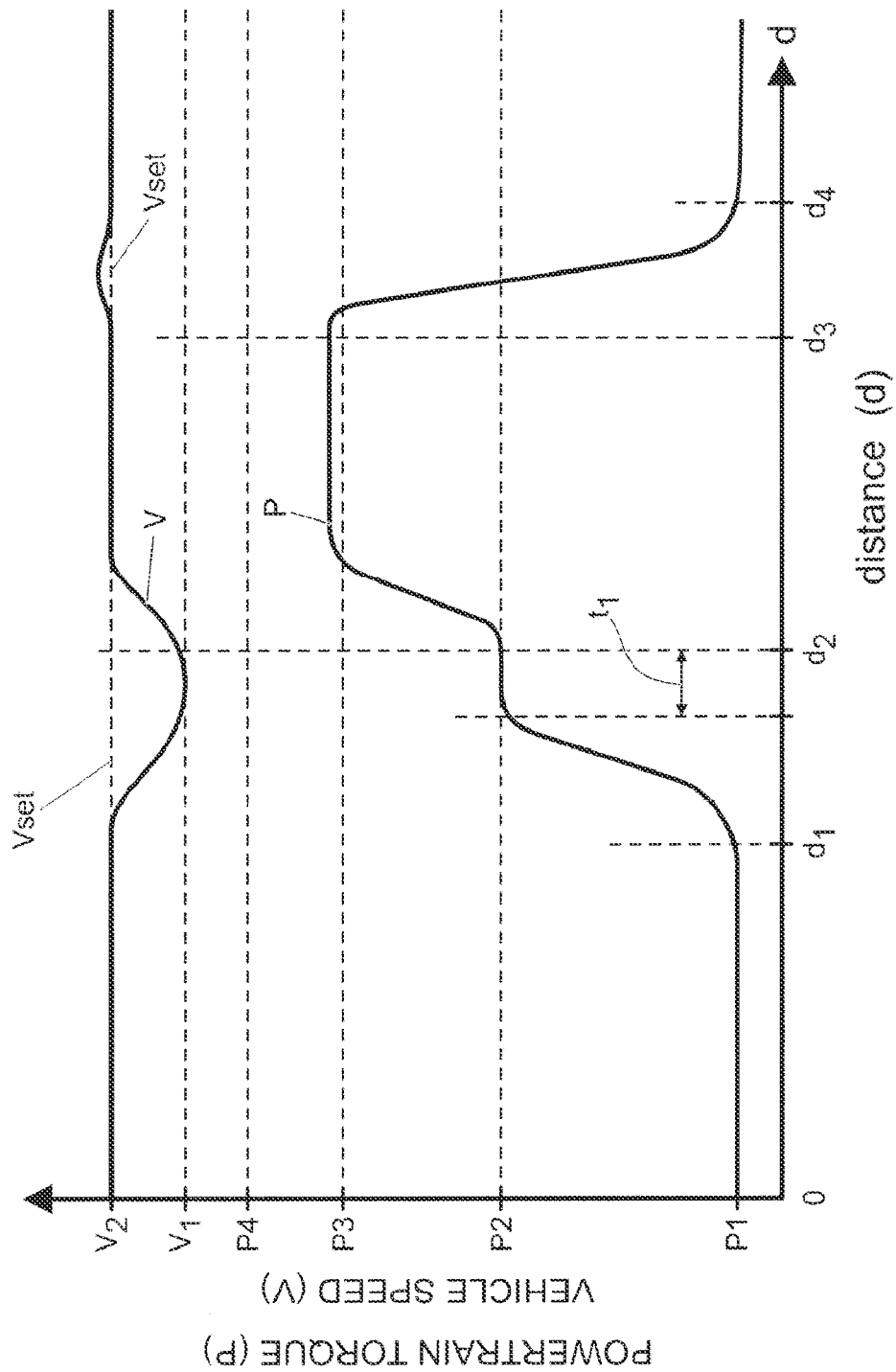
FIG. 15 is a plot of powertrain torque, vehicle speed and set speed as a function of distance in a vehicle according to an embodiment of the present invention over the course of a portion of an example off-road journey.

FIG. 15 illustrates a manner in which an LSP control system 12 according to an embodiment of the present invention may control an amount of torque developed by a vehicle powertrain 129. In the example scenario illustrated, a vehicle 100 is traveling over terrain under the control of the LSP control system 12. As the vehicle 100 travels under the control of the system 12 up to a distance d=d1 from a reference location (at d=0) the powertrain develops an amount of torque P=P1 in order to maintain a set speed v=vset=v2 (also shown in FIG. 15).

As the vehicle 100 moves beyond distance d=d1 the vehicle 100 encounters sandy terrain and an amount of drag on the vehicle 100 due to the terrain increases. The LSP control system 12 detects the increase in drag at least in part due to a decrease in speed of travel v of the vehicle 100. Accordingly the LSP control system 12 increases the amount of power developed by the powertrain 129 to restore the speed to v=vset. In the example shown the LSP control system 12 increases powertrain torque to a value P2 corresponding to the default maximum allowable powertrain torque when the LSP control system 12 is active. The LSP control system 12 continues to monitor speed v and determines that vehicle speed v=v1<vset.

The LSP control system 12 holds the powertrain torque at P1 for a prescribed period of time, in the present embodiment 5 s although other values are also useful. After 5 s have elapsed the vehicle is at distance d2 from the reference location and is still travelling at a speed v<vset. The LSP control system 12 further confirms that after the prescribed minimum period has elapsed the user has not depressed the accelerator pedal 161 or brake pedal 163 in an attempt to intervene in vehicle progress control and in the example shown determines that an increase in powertrain torque above the default maximum value P2 is permissible.

Accordingly the LSP control system 12 determines that an increase in powertrain torque up to a value P4 is permissible and begins to increase powertrain torque. The LSP control system 12 increases powertrain torque and monitors vehicle speed v, controlling the vehicle 100 to achieve the user set speed v=vset. In the example of FIG. 15 the vehicle 100 achieves the user set speed v=vset and maintains this speed with a powertrain torque P=P3<P4.

At distance d=d3 the leading wheels of the vehicle 100 leave the sandy terrain and encounter a relatively hard surface having a relatively low rolling resistance and relatively high coefficient of surface friction. The LSP control system 12 determines that vehicle speed v is now increasing relatively abruptly and commands a reduction in powertrain torque in order to maintain v=vset. In an attempt to prevent excessive overshoot of vset whilst the powertrain torque is being reduced, the system 12 also commands application of a braking system to one or more leading wheels of the vehicle 100. It is to be understood that the braking system is capable of a much faster response to torque commands than a powertrain 129 due to rotational inertia of the powertrain 129 and is therefore well placed to limit set speed overshoot when moving from high to low drag surfaces and the like.

At distance d=d4 the amount of powertrain torque P has reduced back to a value of around P1, being sufficient to maintain the vehicle set speed v=vset=v2 over the terrain encountered at distance d>d4.

It is to be understood that in some embodiments a vehicle 100 may be operated in off-road speed control mode in either forward or reverse driving directions.

Embodiments of the invention may further improve vehicle composure by adapting to rapid or abrupt changes in drag or other forces acting on a vehicle caused by variation in terrain and resisting speed overshoot by a vehicle under the control of the off-road speed control system.

Use of speed control at low speeds when driving off-road may offer a user considerable advantages in reduced user workload and enhanced vehicle composure. However, a speed control system arranged to work off-road would not take into account that although a vehicle may be capable of maintaining a given speed over a varying terrain, some surfaces may be more uncomfortable to drive over than others at the same speed.

The present invention provides an off-road speed control system that is arranged to permit the user to operate the vehicle at low speeds off-road with the off-road speed control system regulating vehicle speed up to a user selected set-speed.

In some embodiments, the off-road speed control system is configured to take into account at least one selected from amongst surface roughness, wheel slip and wheel articulation when determining a maximum speed at which the system will allow the vehicle to drive over a surface.

In some situations the speed control system may be perceived as intervening to reduce the maximum vehicle speed unnecessarily for some users, but intervening sufficiently in the opinion of others.

Off-road speed control systems according to the present invention are intended to enhance off-road driving performance by reducing user workload and enhancing vehicle composure. It is to be understood that a level of vehicle composure may affect all vehicle occupants and not just the person under whose control the vehicle is being operated.

In some embodiments there is provided an off-road speed control system that is provided with at least one selected from amongst information or data in respect of terrain over which the vehicle is driving, vehicle attitude, wheel articulation, wheel speed, driving surface roughness, gear selection, tyre friction, tyre drag, rolling resistance and TR mode.

In an embodiment of the invention the system is further provided with a memory, user operable input means such as a switch, a processor and seat occupancy data. The off-road speed control system may be operable to adjust a comfort setting of the speed control system being a setting used by the system to determine how much to slow the vehicle below a given set-speed for a given ground condition or terrain. The system may be operable to adjust the comfort setting in dependence on data in respect of seat occupancy and an input signal received from the user operable input means.

In operation, the system is configured to log in the memory how the user adjusts the off-road speed control comfort setting for a given amplitude and frequency of vehicle vibration caused by the roughness of the terrain over which the vehicle is driving. When the system determines that a vehicle body vibration is similar to or otherwise matches a sample stored in the memory the processor generates a temporary default baseline set-speed limit below the speed control set-speed that was previously been set by the user. The temporary default baseline set-speed limit is set by the system for the duration of the particular section of terrain the vehicle is travelling over unless overridden by the user.

If the user overrides the system then data corresponding to the fact that the system was over-ridden may be stored in the memory. A look-up table in which data in respect of vehicle speed requested by a user as a function of vehicle vibration characteristic data is stored is updated. In some embodiments the speed control system updates the stored data only if the user repeatedly overrides the system.

In an embodiment of the system, if user adjustment of off-road speed control system speed in respect of a particular user indicates a trend to override the automated speed reduction feature towards a higher speed, then the off-road speed control system may be configured to adopt a user specific baseline speed limit that is higher than the default baseline speed limit for a given type of terrain. That is, a speed limit to which the system may reduce the set-speed in the event that such terrain is encountered that is higher than a default baseline speed limit for that type of terrain. As noted above, in some embodiments terrain 'type' may be quantified by reference to amplitude and frequency of vehicle vibration, optionally wheel articulation, optionally one or more other parameters in addition or instead, such as a value of one or more parameters for a given selected TR mode.

In some embodiments the user specific baseline speed limit may be manually reset by a user such that the system employs the default value of maximum off-road speed control speed, which may be lower than the driver specific baseline speed. In some embodiments the default value may in fact be higher than the driver specific speed.

In some embodiments, in addition or instead, the system may be operable to detect that the off-road speed control system is being employed on a journey where the vehicle is carrying one or more passengers. If such a determination is made the system may be operable to reset a user-specific baseline off-road speed control system speed to the default baseline speed limit.

It is to be understood that in scenarios in which a user typically uses the off-road speed control system when driving alone, the user may opt to accept less vehicle composure in order to drive the vehicle at a faster speed over a given surface. As the user is in control of the vehicle, the movement of the vehicle is likely to be perceived by the user as being in line with their expectations and therefore acceptable. Furthermore, a driver may steady him or herself against a steering wheel and therefore tolerate more vehicle body movement than a passenger might be comfortable with. A passenger, who is not in control of the vehicle, may perceive the same vehicle movement or vibration as being unacceptably uncomfortable. To compensate for this, in some embodiments, when the system detects that the vehicle is carrying one or more passengers, the system defaults to a comfort and composure orientated speed adjustment mode (in which the maximum speed corresponds for example to the default baseline value), unless and until the user manually overrides the setting.

The speed control system may be operable to monitor one or more parameters influencing vehicle body movement and therefore occupant comfort such as a steering wheel or steerable road wheel angle and/or a rate of change thereof. The system may be operable to monitor data indicative of driving surface roughness and correlate this data with one or more vehicle parameters that may influence vehicle body movement such as steering wheel angle, steerable road wheel angle or a rate of change thereof. In the event a user overrides the speed control system, indicating that they feel the speed is too high, the system may determine whether the user chose to override the system because of a feature of terrain over which the vehicle is travelling, or because of another factor influencing vehicle body movement. An example of such a factor might be an action by a driver such as abrupt turning of the steering wheel on terrain that would otherwise not cause excessive user discomfort. In some embodiments the system may take into account vehicle roll angle; for example if the vehicle is driving across a gradient a user may be more sensitive to the fact that the vehicle is tilted about its longitudinal axis and require the system to reduce the set speed even when the terrain is relatively smooth.

Thus it is to be understood that the speed control system may be configured to log data indicating steering wheel angle, steerable road wheel angle or rate of change of one or both, optionally vehicle roll angle, lateral acceleration and the like and be able to determine whether the fact that a user chose to over-ride the speed control system to reduce set speed is because of terrain roughness alone or because of a combination of terrain roughness and one or more other parameters affecting body movement. The system may be configured to take into account whether or not passengers are being carried when a user intervenes to reduce set speed. In the event passengers are not being carried, the vehicle may determine that if a similar scenario is encountered when passengers are being carried in the future, set speed may be reduced to an even lower level than that to which it was reduced when the user was the sole occupant. Furthermore, the system may be operable to reduce set speed when reduced values of one or more parameters affecting vehicle body roll are detected in the future, in the expectation that passengers may be less tolerant of certain body movements than a driver. Furthermore, such action may be prudent also since a centre of gravity of a vehicle may rise in the presence of one or more passengers, resulting in an increased tendency for a vehicle body to move when travelling over certain terrain. In this way, vehicle body movement, whilst the vehicle is under control of the system 12, is managed at least in part, to balance the desire to maintain good progress off-road with the need to manage certain factors that may influence or otherwise affect the comfort of each occupant of the vehicle.

Figure 16:
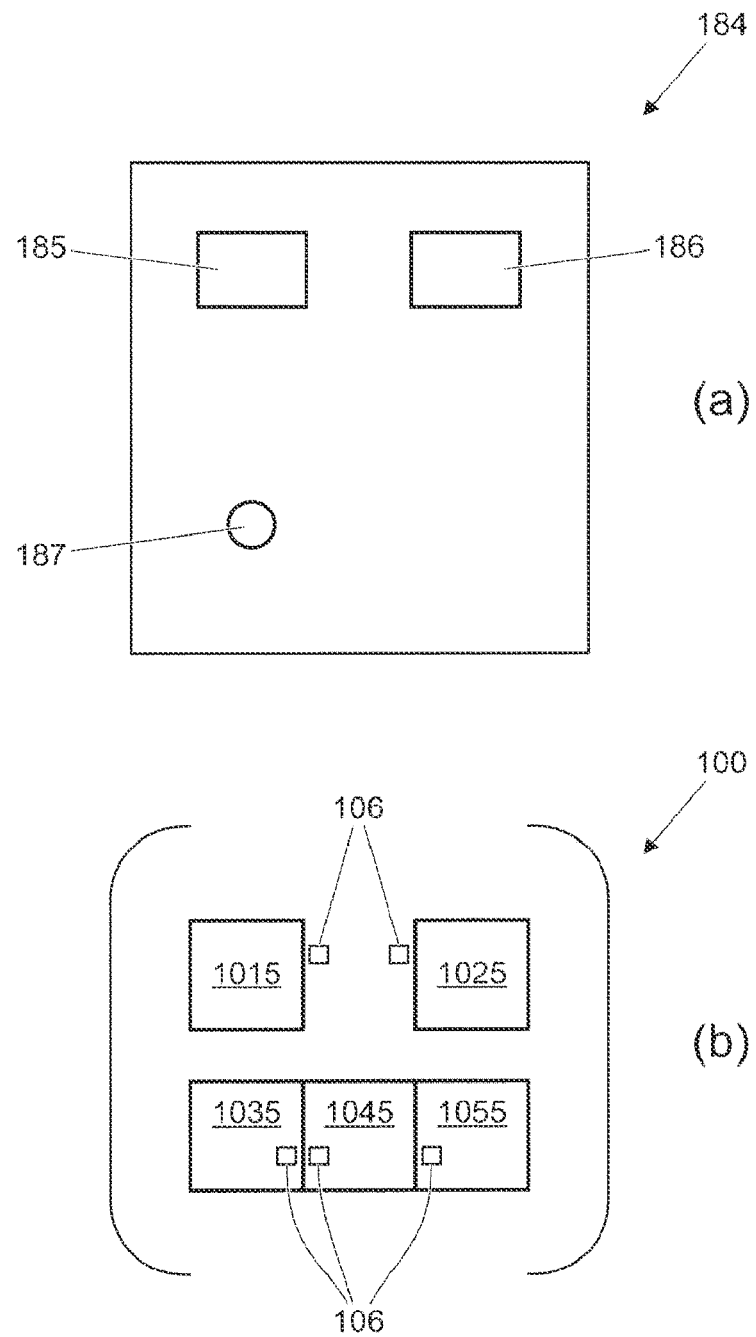
FIG. 16 shows (a) a console installed in a vehicle according to an embodiment of the present invention and (b) a plan view of a cabin of a vehicle according to an embodiment of the present invention.

FIG. 16(a) shows a console 184 of a vehicle 100 according to an embodiment of the present invention having user configurable progress control. The console has a user operable button 187 depression of which provides a control signal to a processor 185 associated with the LSP control system 12. The processor is operable to store and retrieve data from a memory 186 also associated with the LSP control system 12.

The LSP control system 12 is operable to receive data indicative of seat occupancy of the vehicle. That is, data indicative as to whether a given seat of the vehicle other than a driver's seat is occupied. FIG. 16(b) is a plan view of a cabin of a vehicle according to an embodiment of the invention showing seats 101S to 105S. The LSP system 12 receives data corresponding to a state of a switch embedded in a seat belt buckle 106 associated with each seat 101S-105S. If the state of the switch indicates that the buckle 106 is fastened, the LSP system 12 considers that the seat associated with the buckle is occupied. If the state of the switch indicates the buckle 106 is unfastened, the LSP system 12 considers that the seat associated with the buckle 106 is unoccupied. Seat occupancy may be determined by sensors in each seat or by means of an infrared or visible light camera arranged to observe the interior of the occupant compartment. Other means for determining seat occupancy are also useful. Memory 186 may be divided so as to store data in respect of a plurality of known drivers and their associated preferences. The system may be arranged to identify a driver by identification of one selected from amongst a seat adjustment position, a user specific key fob identity, or other known means.

In some embodiments, the maximum speed (set-speed limit) imposed automatically by the system may be adjusted automatically by the system based on duration and vehicle behaviour in dependence on a determination that vehicle body acceleration exceeds a pre-determined threshold. This may be used to enhance vehicle composure and act as a means for determining vehicle movement independently of an output of one or more wheel speed sensors. This may be useful in situations in which no two wheel speed readings match each other.

This feature may be employed across multiple vehicle variants with different suspension spring/damper settings and be used in vehicles whose characteristics may vary over time. Employment of vehicle body acceleration measurements may free the speed control system from being tied to a specific vehicle or suspension variant.

It is to be understood that in some embodiments an off road speed control system may be operable in either forward or reverse driving use.

It is to be understood that the control system according to an may form part of an ATPC (All-Terrain Progress Control) system, which may be arranged to work independently or in conjunction with one or more vehicle control systems arranged to optimise one or more vehicle configurations such as one or more sub-system configurations for a given terrain over which the vehicle is travelling. An example of such a system is a Terrain Response® system.

Some embodiments of the invention enhance enjoyment of a vehicle by a given user when driving alone and passengers when being carried by the same user, since the level of vehicle composure that may be tolerated by one or more passengers may differ from that which may be tolerated by the user.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

For the avoidance of doubt it is explicitly stated that it is to be understood that aspects or embodiments of the invention described under each of headings 1 to 10 above are not to be interpreted as necessarily including one or more features described under another one or more of headings 1 to 10 unless explicitly stated. It is also to be understood that aspects or embodiments of the invention described under one or more of headings 1 to 10 are applicable to any other embodiment whether under another one or more of headings 1 to 10 or not unless incompatible therewith. Reference to features of a common figure such as FIG. 1 or any other figure under a plurality of headings 1 to 10 is not to be interpreted as requiring that aspects or embodiments described under a given heading also have the features that are described with respect to the common figure under another heading.

The invention claimed is:

1. A vehicle speed control system for a vehicle having a plurality of wheels, the vehicle speed control system configured to automatically control the speed of the vehicle to a target speed, the vehicle speed control system comprising one or more electronic control units arranged to:
   control the application of torque to at least one of the plurality of wheels;
   detect a slip event between any one or more of the wheels and the surface over which the vehicle is travelling when the vehicle is in motion and provide a slip detection output signal in the event thereof;

receive a user input of a target set-speed at which the vehicle is intended to travel; and control the application of torque to the at least one of the plurality of wheels so as to maintain the vehicle at the target speed independently of the slip detection output signal by requesting the application of increased net torque to the at least one of the plurality of wheels when the vehicle speed needs to be increased to maintain the vehicle at the target speed and by requesting a reduction of net torque applied to the vehicle wheels when the vehicle speed needs to be decreased to maintain the vehicle at the target speed.

2. The vehicle speed control system as claimed in claim 1, wherein said one or more electronic control units control the application of torque to the at least one of the plurality of wheels so as to maintain the vehicle speed at the target speed by:

determining a current speed at which the vehicle is travelling;

comparing the current speed with the target speed and providing an output indicative of the difference between the current speed and the target speed; and evaluating the torque to be applied to at least one of the vehicle wheels in dependence on the output.

3. The vehicle speed control system as claimed in claim 2, wherein said one or more electronic control units are arranged to apply torque to at least two wheels of the vehicle simultaneously.

4. The vehicle speed control system as claimed in claim 3, wherein said one or more electronic control units are arranged to apply torque to at least four wheels of the vehicle simultaneously.

5. The vehicle speed control system as claimed in claim 1, wherein said one or more electronic control units are further arranged to:

inhibit operation of the vehicle speed control system in the event that the current speed is determined to be in excess of a predetermined threshold speed.

6. The vehicle speed control system as claimed in claim 5, wherein the predetermined threshold speed is between 25 and 35 mph.

7. The vehicle speed control system as claimed in claim 6, wherein the predetermined threshold speed is substantially 30 mph.

8. The vehicle speed control system as claimed in claim 5, wherein the predetermined threshold speed is a first, lower threshold speed, the said one or more electronic control units being arranged to:

compare the current vehicle speed with a second, higher threshold speed and, if the current vehicle speed is less than the second, higher threshold speed, hold the vehicle speed control system in a wait state and initiate vehicle speed control only once the current vehicle speed is reduced to below the first, lower threshold speed.

9. The vehicle speed control system as claimed in claim 5, further comprising a cruise control system which is operable to maintain vehicle speed at speeds above the predetermined threshold speed.

10. The vehicle speed control system as claimed in claim 9, wherein the cruise control system comprises means for suspending operation of the system on receiving the slip detection output signal.

11. The vehicle speed control system as claimed in claim 1, wherein said one or more electronic control units are arranged to:

detect the nature of the terrain over which the vehicle is travelling;

determine whether the target speed is appropriate for the nature of the terrain over which the vehicle is travelling; and maintain the vehicle at the target speed by applying torque to the at least one of the plurality of wheels only if the target speed is determined to be appropriate.

12. The vehicle control system as claimed in claim 11 wherein the system includes one or more of: an ambient temperature sensor, an atmospheric pressure sensor, a tire pressure sensor, a yaw sensor to detect yaw, roll and/or pitch of the vehicle, and a gradient sensor, wherein said one or more electronic control units are arranged to receive signals from one or more of: the ambient temperature sensor, the atmospheric pressure sensor, the tyre pressure sensor, the yaw sensor, and the gradient sensor, and wherein said one or more electronic control units are configured to determine the nature of the terrain in response to said signals.

13. A vehicle comprising a control system as claimed in claim 1.

14. A method of automatically controlling a speed to a target speed of a vehicle having a plurality of wheels, the method comprising:

applying torque to at least one of the plurality of wheels;

detecting a slip event between any one or more of the wheels and the ground over which the vehicle is travelling when the vehicle is in motion and providing a slip detection output signal in the event thereof;

receiving a user input of a target speed at which the vehicle is intended to travel; and automatically maintaining the vehicle at the target speed independently of the slip detection output signal by applying torque to the at least one of the plurality of wheels by applying additional torque to the at least one of the plurality of wheels when the vehicle speed needs to be increased to maintain the vehicle at the target speed and by reducing torque applied to the vehicle wheels when the vehicle speed needs to be decreased to maintain the vehicle at the target speed.

15. The method as claimed in claim 14, wherein maintaining the vehicle speed at the target speed includes:

determining a current speed at which the vehicle is travelling;

comparing the current speed with the target speed and for providing an output indicative of the difference between the current speed and the target speed; and evaluating the torque to be applied to at least one of the vehicle wheels in dependence on the output.

16. The method as claimed in claim 15, further comprising:

inhibiting operation of the vehicle control system in the event that the current speed is determined to be in excess of a predetermined threshold speed.

17. The method as claimed in claim 16, wherein the predetermined threshold speed is a first, lower threshold speed, the method further comprising:

comparing the current vehicle speed with a second, higher threshold speed and, if the current vehicle speed is less than the second, higher threshold speed, holding the vehicle speed control system in a wait state and initiating vehicle speed control only once the current vehicle speed is reduced to below the first, lower threshold speed.

18. The method as claimed in claim 16, further comprising operating a cruise control system to maintain vehicle speed at speeds above the predetermined threshold speed and suspending operation of the cruise control system on receiving the slip detection output signal.

19. The method as claimed in claim 14, further comprising:
   detecting the nature of the terrain over which the vehicle is travelling;
   determining whether the target speed is appropriate for the nature of the terrain over which the vehicle is travelling; and
   maintaining the vehicle at the target speed by applying torque to the at least one of the plurality of wheels only if the target speed is determined to be appropriate.

20. A carrier medium carrying a computer readable code for controlling a vehicle to carry out the method according to claim 14.

* * * * *